US010938520B2

United States Patent
Balasubramanian et al.

(10) Patent No.: US 10,938,520 B2
(45) Date of Patent: Mar. 2, 2021

(54) METHODS TO REDUCE RADIO LINK CONTROL RETRANSMISSION

(71) Applicant: QUALCOMM Incorporated, San Diego, CA (US)

(72) Inventors: Arun Prasanth Balasubramanian, San Diego, CA (US); Shailesh Maheshwari, San Diego, CA (US); Xing Chen, San Diego, CA (US); Arnaud Meylan, San Diego, CA (US); Jason Tan, San Diego, CA (US); Wei-Jei Song, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/419,751

(22) Filed: May 22, 2019

(65) Prior Publication Data

US 2020/0374047 A1 Nov. 26, 2020

(51) Int. Cl.
*H04L 1/18* (2006.01)
*H04W 28/04* (2009.01)

(52) U.S. Cl.
CPC .......... *H04L 1/1841* (2013.01); *H04L 1/1848* (2013.01); *H04W 28/04* (2013.01)

(58) Field of Classification Search
CPC . H04L 1/1841; H04L 1/1848; H04L 41/0654; H04W 28/04; H04B 10/03;
(Continued)

(56) References Cited

U.S. PATENT DOCUMENTS 8,018,945 B2 * 9/2011 Zhang ................... H04L 1/1812
370/394
9,906,332 B2 * 2/2018 Rawat ................... H04L 1/1848
(Continued)

FOREIGN PATENT DOCUMENTS

WO WO-2018202190 A1 11/2018

OTHER PUBLICATIONS

Rezaei, Fahimeh, et al. "Analysis and evaluation of covert channels over LTE advanced." 2013 IEEE Wireless Communications and Networking Conference (WCNC). IEEE, 2013. (Year: 2013).*

(Continued)

*Primary Examiner* — Sharad Rampuria
(74) *Attorney, Agent, or Firm* — Holland & Hart LLP

(57) ABSTRACT

Methods, systems, and devices for wireless communications are described. A receiving device may receive, at a first operational layer of the receiving device, one or more protocol data units (PDUs) within a set of PDUs. The receiving device may identify, at a second operational layer of the receiving device, a sequence gap associated with a missing PDU from the set of PDUs, the first operational layer being a lower operational layer of the receiving device than the second operational layer. The receiving device may determine, at the second operational layer, that a triggering condition associated with the missing PDU has occurred. The receiving device may provide, by the second operational layer and based at least in part on the triggering condition occurring, an indication to update a reception buffer of the first operational layer to a last received protocol data unit of the set of PDUs.

26 Claims, 14 Drawing Sheets

(58) Field of Classification Search
CPC .. H04B 10/032; H04B 10/035; H04B 10/038; H04J 14/0287; H04J 14/0289; H04J 14/029; H04J 14/0291; H04J 14/0293; H04J 14/0294; H04J 14/0295; H04J 14/0297; H04J 2203/006
See application file for complete search history.

(56) References Cited

U.S. PATENT DOCUMENTS

| | | | |
|---|---|---|---|
| 10,484,258 B2 * | 11/2019 | Skarve | H04L 1/1819 |
| 2019/0053099 A1 * | 2/2019 | Kim | H04W 76/27 |
| 2020/0068652 A1 | 2/2020 | Xu et al. | |

OTHER PUBLICATIONS

Huawei., et al., "Discussion on Skew Issue for Split Bear", 3GPP Draft, 3GPP TSG-RAN WG2 Meeting #86, R2-142094, 3RD Generation Partnership Project (3GPP), Mobile Competence Centre, 650, Route Des Lucioles, F-06921, Sophia-Antipolis Cedex, France, vol. RAN WG2, No. Seoul, South Korea, May 19, 2014-May 23, 2014, May 18, 2014 (May 18, 2014), XP050793328, 6 pages, Retrieved from the Internet: URL: http://www.3gpp.org/ftp/Meetings_3GPP_SYNC/RAN2/Docs/ [retrieved on May 18, 2014], figures 1-6, sections 2.1-2.4.

Huawei., et al., "RLC Optimization for Packet Duplication", 3GPP Draft, 3GPP TSG-RAN WG2 Ad Hoc, R2-1800205, RLC Optimization for Packet Duplication, 3RD Generation Partnership Project (3GPP), Mobile Competence Centre, 650, Route Des Lucioles, F-06921, Sophia-Antipolis Cedex, France, vol. RAN WG2, No. Vancouver, Canada; Jan. 22, 2018-Jan. 26, 2018, Jan. 12, 2018 (Jan. 12, 2018), XP051386075, 3 pages, Retrieved from the Internet: URL: http://www.3gpp.org/ftp/tsg%5Fran/WG2%5FRL2/TSGR2%5FAHS/2018%5F01%5FNR/Docs/ [retrieved on Jan. 12, 2018] section 2 figure 1.

International Search Report and Written Opinion—PCT/US2020/030931—ISA/EPO—dated Aug. 17, 2020.

OPPO: "Left Issues on PDCP Operation for LTE RLC", 3GPP Draft, 3GPP TSG-RAN2 Meeting #99bis, R2-1710144—Left Issues on PDCP Operation for LTE RLC, 3RD Generation Partnership Project (3GPP), Mobile Competence Centre, 650, Route Des Lucioles, F-06921, Sophia-Antipolis Cedex, France, vol. RAN WG2, No. Prague, Czech; Oct. 9, 2017-Oct. 13, 2017, Sep. 28, 2017 (Sep. 28, 2017), XP051354223, 3 pages, Retrieved from the Internet: URL: http://www.3gpp.org/ftp/tsg_ran/WG2_RL2/TSGR2_99bis/Docs/ [retrieved on Sep. 28, 2017] section 2.1.

* cited by examiner

METHODS TO REDUCE RADIO LINK CONTROL RETRANSMISSION

INTRODUCTION

The following relates generally to wireless communications, and more specifically to managing retransmissions from a radio link control (RLC) layer.

Wireless communication systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

SUMMARY

A method of wireless communications at a receiving device is described. The method may include receiving, at a first operational layer of the receiving device, one or more protocol data units (PDUs) within a set of PDUs, identifying, at a second operational layer of the receiving device, a sequence gap associated with a missing protocol data unit (PDU) from the set of PDUs, the first operational layer being a lower operational layer of the receiving device than the second operational layer, determining, at the second operational layer, that a triggering condition associated with the missing PDU has occurred, and providing, by the second operational layer and based on the triggering condition occurring, an indication to update a reception buffer of the first operational layer to a last received PDU of the set of PDUs.

An apparatus for wireless communications at a receiving device is described. The apparatus may include a processor, memory in electronic communication with the processor, and instructions stored in the memory. The instructions may be executable by the processor to cause the apparatus to receive, at a first operational layer of the receiving device, one or more PDUs within a set of PDUs, identify, at a second operational layer of the receiving device, a sequence gap associated with a missing PDU from the set of PDUs, the first operational layer being a lower operational layer of the receiving device than the second operational layer, determine, at the second operational layer, that a triggering condition associated with the missing PDU has occurred, and provide, by the second operational layer and based on the triggering condition occurring, an indication to update a reception buffer of the first operational layer to a last received PDU of the set of PDUs.

Another apparatus for wireless communications at a receiving device is described. The apparatus may include means for receiving, at a first operational layer of the receiving device, one or more PDUs within a set of PDUs, identifying, at a second operational layer of the receiving device, a sequence gap associated with a missing PDU from the set of PDUs, the first operational layer being a lower operational layer of the receiving device than the second operational layer, determining, at the second operational layer, that a triggering condition associated with the missing PDU has occurred, and providing, by the second operational layer and based on the triggering condition occurring, an indication to update a reception buffer of the first operational layer to a last received PDU of the set of PDUs.

A non-transitory computer-readable medium storing code for wireless communications at a receiving device is described. The code may include instructions executable by a processor to receive, at a first operational layer of the receiving device, one or more PDUs within a set of PDUs, identify, at a second operational layer of the receiving device, a sequence gap associated with a missing PDU from the set of PDUs, the first operational layer being a lower operational layer of the receiving device than the second operational layer, determine, at the second operational layer, that a triggering condition associated with the missing PDU has occurred, and provide, by the second operational layer and based on the triggering condition occurring, an indication to update a reception buffer of the first operational layer to a last received PDU of the set of PDUs.

Some examples of the method, apparatuses, and non-transitory computer-readable medium described herein may further include operations, features, means, or instructions for identifying a sequence number of a last PDU within the set of PDUs that was delivered to a third operational layer that may be a higher operational layer of the receiving device than the second operational layer, and providing a signal to the first operational layer indicating an update value for the reception buffer of the first operational layer based on the sequence number of the last PDU.

Some examples of the method, apparatuses, and non-transitory computer-readable medium described herein may further include operations, features, means, or instructions for initiating a reordering timer upon identifying the sequence gap associated with the missing PDU.

In some examples of the method, apparatuses, and non-transitory computer-readable medium described herein, the first operational layer includes at least one of a LTE RLC layer, or a NR RLC layer, or a combination thereof.

Some examples of the method, apparatuses, and non-transitory computer-readable medium described herein may further include operations, features, means, or instructions for providing a first signal to the LTE RLC layer indicating a first update value for the reception buffer of the LTE RLC layer, and providing a second signal to the NR RLC layer indicating a second update value for the reception buffer of the NR RLC layer.

In some examples of the method, apparatuses, and non-transitory computer-readable medium described herein, the reception buffer of the first operational layer includes at least one of a receive next (RX_NEXT) reception buffer, or a receive state variable (VR(R)) reception buffer, or a combination thereof.

In some examples of the method, apparatuses, and non-transitory computer-readable medium described herein, the second operational layer includes a packet data convergence protocol (PDCP) layer.

In some examples of the method, apparatuses, and non-transitory computer-readable medium described herein, the triggering condition includes at least one of expiration of a reordering timer associated with the missing PDU, or reaching a storage limit for a memory associated with the set of PDUs, or a combination thereof.

A method of wireless communications at a receiving device is described. The method may include receiving, at a first operational layer of the receiving device, one or more PDUs within a set of PDUs, providing the received PDUs to a second operational layer of the receiving device, the first operational layer being a lower operational layer of the receiving device than the second operational layer, identifying an indication from the second operational layer to update a reception buffer of the first operational layer based on a sequence gap associated with a missing PDU from the set of PDUs, and updating the reception buffer based on the indication.

An apparatus for wireless communications at a receiving device is described. The apparatus may include a processor, memory in electronic communication with the processor, and instructions stored in the memory. The instructions may be executable by the processor to cause the apparatus to receive, at a first operational layer of the receiving device, one or more PDUs within a set of PDUs, provide the received PDUs to a second operational layer of the receiving device, the first operational layer being a lower operational layer of the receiving device than the second operational layer, identify an indication from the second operational layer to update a reception buffer of the first operational layer based on a sequence gap associated with a missing PDU from the set of PDUs, and update the reception buffer based on the indication.

Another apparatus for wireless communications at a receiving device is described. The apparatus may include means for receiving, at a first operational layer of the receiving device, one or more PDUs within a set of PDUs, providing the received PDUs to a second operational layer of the receiving device, the first operational layer being a lower operational layer of the receiving device than the second operational layer, identifying an indication from the second operational layer to update a reception buffer of the first operational layer based on a sequence gap associated with a missing PDU from the set of PDUs, and updating the reception buffer based on the indication.

A non-transitory computer-readable medium storing code for wireless communications at a receiving device is described. The code may include instructions executable by a processor to receive, at a first operational layer of the receiving device, one or more PDUs within a set of PDUs, provide the received PDUs to a second operational layer of the receiving device, the first operational layer being a lower operational layer of the receiving device than the second operational layer, identify an indication from the second operational layer to update a reception buffer of the first operational layer based on a sequence gap associated with a missing PDU from the set of PDUs, and update the reception buffer based on the indication.

Some examples of the method, apparatuses, and non-transitory computer-readable medium described herein may further include operations, features, means, or instructions for resetting a negative acknowledgement (NACK) list to exclude the missing PDU based on the updated reception buffer.

Some examples of the method, apparatuses, and non-transitory computer-readable medium described herein may further include operations, features, means, or instructions for receiving a signal from the second operational layer indicating an update value for the reception buffer of the first operational layer based on a sequence number of a last PDU that the second operational layer delivered to a third operational layer that may be a higher operational layer of the receiving device than the second operational layer.

In some examples of the method, apparatuses, and non-transitory computer-readable medium described herein, the first operational layer includes at least one of a LTE RLC layer, or a NR RLC layer, or a combination thereof.

In some examples of the method, apparatuses, and non-transitory computer-readable medium described herein, the reception buffer of the first operational layer includes at least one of a RX_NEXT reception buffer, or a VR(R) reception buffer, or a combination thereof.

In some examples of the method, apparatuses, and non-transitory computer-readable medium described herein, the second operational layer includes a PDCP layer.

DETAILED DESCRIPTION

Figure 1:
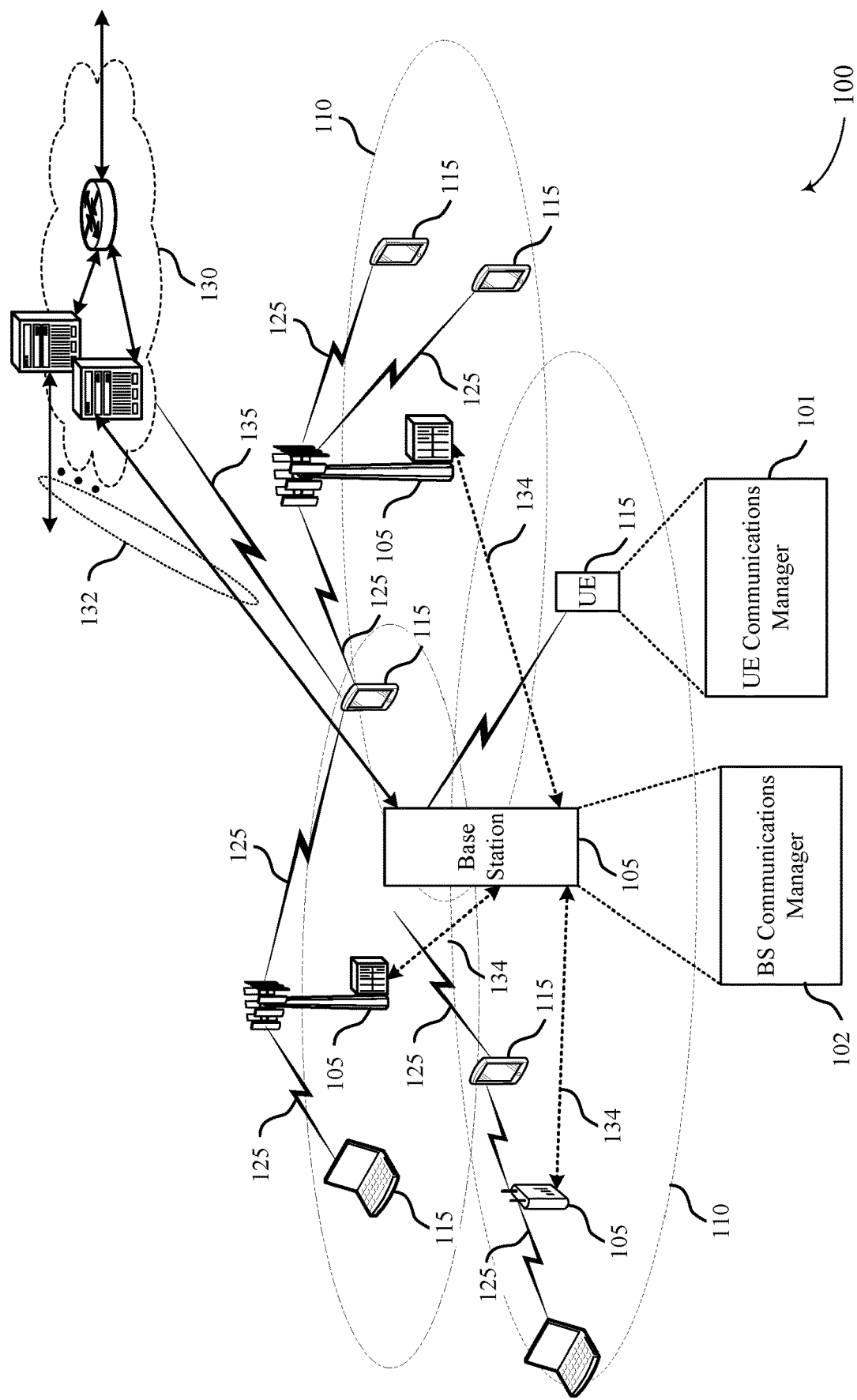
FIG. 1 illustrates an example of a system for wireless communications that supports methods to reduce RLC retransmission, in accordance with one or more aspects of the present disclosure.

Wireless communication devices may operate according to a layered protocol, commonly referred to as a protocol stack. For example, the protocol stack may be implemented by UE and base stations (or network devices) operating on the wireless network, with each operational layer of the protocol stack responsible for its own corresponding function(s). In some examples, the protocol stack may include three layers (e.g., layer 1 (L1), layer 2 (L2), and layer 3 (L3)), with each operational layer (or sublayer) having one or more functions that are designed to collectively package and communicate information over the wireless medium. One example layer includes the PDCP layer (a sublayer within L2), which manages aspects of header compression and decompression of internet protocol (IP) data, transfer of data (for both the user plane and control plane data), maintenance of PDCP sequence numbers (SNs), in-sequence delivery of upper layer PDUs, ciphering/de-ciphering, integrity protection, packet expiry timer-based discard, and the like. At a transmitting device, the PDCP layer packages the data packets and delivers them to lower layers (e.g., the RLC sublayer, medium access control (MAC) sublayer, and finally to the physical (PHY) layer) for wireless transmission.

According to some techniques, various functions of the PDCP layer may perform PDU reordering. For example, once a PDCP reordering timer (t-reordering timer) expires, the PDCP layer flushes all of the PDUs up to the received reorder (RX_REORDER) PDU SN and the PDUs with a consecutive count (e.g., consecutive PDU SNs) starting from the RX_REORDER. A receive deliver (RX_DELIV) PDU SN value may then be updated to the first PDCP service data unit (SDU) count that has not been delivered to upper layers, with the COUNT value being set to the RX_REORDER. However, this process does not stop an RLC receive entity (e.g., an RLC layer) from requesting retransmission of RLC PDUs associated with the PDCP PDUs with COUNT RX_DELIV (e.g., RLC moves its receiving window forward after the missing PDU(s) are received). Even if the retransmission attempt was successful at the RLC layer, the PDCP receive entity may drop the PDUs as per the receive window operation. If the dropped PDU exceeds more than half the PDCP receiving window, the PDCP count will be mismatched between the receiving device and the network, which may cause a deciphering failure at the receiving device and, in some instances, radio link failure. This may negatively impact the overall throughput as well as create unnecessary bandwidth waste and excessive power consumption.

Accordingly, aspects of the described techniques provide a mechanism to reduce (or avoid) RLC retransmission(s) in the situation where there are missing PDU SN(s). Broadly, this may include a PDCP receive entity (e.g., a PDCP operational layer of a receiving device) indicating to RLC receive entity(s) (e.g., an RLC operational layer of the receiving device) the RLC SN(s) associated with a last PDCP PDU delivered to upper layers when the RX_DELIV value is updated. For example, a first operational layer (e.g., the RLC layer) may receive PDUs within a set of PDUs, and provide the received PDUs to a second operational layer (e.g., the PDCP layer) of the receiving device. The second operational layer may identify a sequence gap associated with a missing PDU, e.g., determine that the SNs of the PDUs received from the RLC layer are nonsequential or otherwise have missing PDU SN(s). In some aspects, the second operational layer may also determine that a triggering condition associated with the missing PDU (or with the received PDUs) has occurred. For example, the triggering condition may include the expiration of a reordering timer, a storage limit of a memory has been reached, and the like. Accordingly, the second operational layer may transmit or otherwise provide an indication to the first operational layer to update a reception buffer (e.g., a window) to a last received PDU in the set of PDUs. For example, the second operational layer may determine or otherwise identify the SN of the last PDU that was delivered to a higher layer, and provide the indication to the first operational layer of an update value for the reception buffer. Accordingly, the first operational layer may move or otherwise update the receive window lower edge (e.g., the reception buffer) to the update value received from the second operational layer of the receiving device. This may reduce or avoid the need for hybrid automatic repeat request (HARQ) retransmissions at the RLC layer, which may advantageously reduce power consumption, conserve over the air resources, and the like, for the wireless communication system. In some aspects, the first operational layer may also reset its NACK list based on the indication from the second operations layer to update its reception buffer, e.g., to avoid RLC retransmissions.

Aspects of the disclosure are initially described in the context of a wireless communication system. Aspects of the disclosure are further illustrated by and described with reference to apparatus diagrams, system diagrams, and flowcharts that relate to methods to reduce RLC retransmission.

FIG. 1 illustrates an example of a wireless communication system 100 that supports methods to reduce RLC retransmission, in accordance with one or more aspects of the present disclosure. The wireless communication system 100 includes base stations 105, UEs 115, and a core network 130. In some examples, the wireless communication system 100 may be a LTE network, an LTE-A network, an LTE-A Pro network, or a NR network. In some cases, wireless communication system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communication system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communication system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communication system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communication system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communication system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communication system 100 may operate using one or more frequency bands, e.g., in the range of 300 megahertz (MHz) to 300 gigahertz (GHz). The region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communication system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communication system 100 may also operate in an extremely high frequency (EHF) region of the spectrum (e.g., from 30 GHz to 300 GHz), also known as the millimeter band. In some examples, wireless communication system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communication system 100 may utilize both licensed and unlicensed radio frequency spectrum bands. For example, wireless communication system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communication system 100 may be a packet-based network that operate according to a layered protocol stack. In the user plane, communications at the bearer or Packet Data Convergence Protocol (PDCP) layer may be IP-based. A RLC layer may perform packet segmentation and reassembly to communicate over logical channels. A MAC layer may perform priority handling and multiplexing of logical channels into transport channels. The MAC layer may also use HARQ to provide retransmission at the MAC layer to improve link efficiency. In the control plane, the radio resource control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communication system 100, and may be referred to as a transmission time interval (TTI). In other cases, a smallest scheduling unit of the wireless communication system 100 may be shorter than a subframe or may be dynamically selected (e.g., in bursts of shortened TTIs (sTTIs) or in selected component carriers using sTTIs).

In some wireless communication systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communication systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communication system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RB s) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communication system 100 (e.g., base stations 105 or UEs 115) may have a hardware configuration that supports communications over a particular carrier bandwidth, or may be configurable to support communications over one of a set of carrier bandwidths. In some examples, the wireless communication system 100 may include base stations 105 and/or UEs 115 that support simultaneous communications via carriers associated with more than one different carrier bandwidth.

Wireless communication system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communication system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communication system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

For example, one or more of the base stations 105 (which may be considered a receiving device in this context) may include a base station (BS) communication manager 102, which may receive, at a first operational layer of the receiving device, one or more PDUs within a set of PDUs. The BS communication manager 102 may identify, at a second operational layer of the receiving device, a sequence gap associated with a missing PDU from the set of PDUs, the first operational layer being a lower operational layer of the receiving device than the second operational layer. The BS communication manager 102 may determine, at the second operational layer, that a triggering condition associated with the missing PDU has occurred. The BS communication manager 102 may provide, by the second operational layer and based at least in part on the triggering condition occurring, an indication to update a reception buffer of the first operational layer to a last received PDU of the set of PDUs In another example, the BS communication manager 102 may receive, at a first operational layer of the receiving device, one or more PDUs within a set of PDUs. The BS communication manager 102 may provide the received PDUs to a second operational layer of the receiving device, the first operational layer being a lower operational layer of the receiving device than the second operational layer. The BS communication manager 102 may identify an indication from the second operational layer to update a reception buffer of the first operational layer based at least in part on a sequence gap associated with a missing PDU from the set of PDUs. The BS communication manager 102 may update the reception buffer based at least in part on the indication.

In some aspects, one or more of the UEs 115 (which may be considered a receiving device in this context) may include a UE communications manager 101, which may receive, at a first operational layer of the receiving device, one or more PDUs within a set of PDUs. The UE communications manager 101 may identify, at a second operational layer of the receiving device, a sequence gap associated with a missing PDU from the set of PDUs, the first operational layer being a lower operational layer of the receiving device than the second operational layer. The UE communications manager 101 may determine, at the second operational layer, that a triggering condition associated with the missing PDU has occurred. The UE communications manager 101 may provide, by the second operational layer and based at least in part on the triggering condition occurring, an indication to update a reception buffer of the first operational layer to a last received PDU of the set of PDUs.

In another example, the UE communications manager 101 may receive, at a first operational layer of the receiving device, one or more PDUs within a set of PDUs. The UE communications manager 101 may provide the received PDUs to a second operational layer of the receiving device, the first operational layer being a lower operational layer of the receiving device than the second operational layer. The UE communications manager 101 may identify an indication from the second operational layer to update a reception buffer of the first operational layer based at least in part on a sequence gap associated with a missing PDU from the set of PDUs. The UE communications manager 101 may update the reception buffer based at least in part on the indication.

Figure 2:
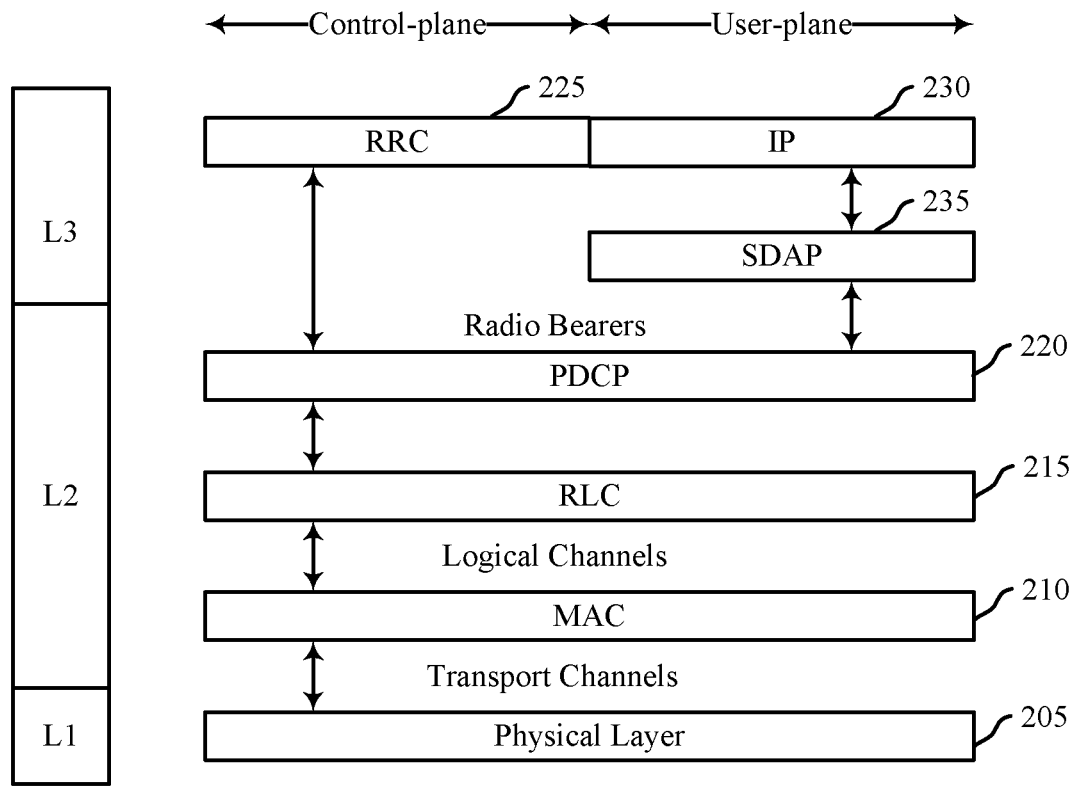
FIG. 2 illustrates an example of a protocol stack that supports methods to reduce RLC retransmission, in accordance with one or more aspects of the present disclosure.

FIG. 2 illustrates an example of a protocol stack 200 that supports methods to reduce RLC retransmission, in accordance with one or more aspects of the present disclosure. In some examples, protocol stack 200 may implement aspects of wireless communication system 100. Aspects of protocol stack 200 may be implemented by a receiving device, which may be an example of a UE and/or base station, as are described herein.

Protocol stack 200 may include a plurality of layers, with each layer performing a different function for wireless transmissions. For example, protocol stack 200 includes a physical layer 205, a MAC layer 210, an RLC layer 215, a PDCP layer 220, an RRC layer 225, an IP layer 230, and a service data adaptation protocol (SDAP) layer 235. It is to be understood that more or fewer layers may be implemented for wireless communications in protocol stack 200. Moreover, it is also to be understood that the term layers may refer to an operational layer, which may include one or more processes, functions, services, and the like, being performed by a device in hardware, software, or any combination thereof.

Protocol stack 200 may support wireless communications between a base station and the UE, between base stations, between UEs, and the like. A transmitting device may utilize aspects of protocol stack 200 to package and transmit a message to a receiving device. The transmitting device may be a base station transmitting to a UE in a downlink scenario or a UE transmitting to a base station in an uplink scenario. The UE would be considered the receiving device in the downlink scenario, with the base station being considered the receiving device and the uplink scenario. However, it is to be understood that the described techniques are not limited to traditional uplink/downlink transmissions and, instead, may be utilized in D2D communications, inter-base station communications, access and/or backhaul communications, and the like.

As discussed, each operational layer within protocol stack 200 may perform a different function in packaging or otherwise preparing a message for transmission on the transmitting device side and/or for message reception and recovery on the receiving device side. Broadly, the functions performed within the layers of protocol stack 200 will be described generically with reference to a PDU by way of example. However, it is to be understood that the functions performed by the layers of protocol stack 200 may be implemented for any message type, such as uplink messages, downlink messages, data messages, control messages, and the like.

In some aspects, the layers within protocol stack 200 can be divided into a L3, a L2, and a L1. L1 is the lowest operational layer and implements various physical layer signal processing functions. L2 is above the L1 and is responsible for the link between the UE and base station over the physical layer 205.

In the user plane, L2 includes the MAC layer 210, a RLC layer 215, and a PDCP layer 220, which are terminated at the network device on the network side. Protocol stack 200 may include several upper layers above the L2 including a network layer (e.g., IP layer 230) that may be terminated at a PDN gateway on the network side, and an application layer that is terminated at the other end of the connection (e.g., far end UE, server, etc.). The SDAP layer 235 may manage aspects of the mapping between a quality of service flow and a data radio bearer, marking quality of service flow identifiers invoked for downlink and uplink packets, and the like. In some aspects, a single protocol entity of SDAP layer 235 may be configured for each individual PDU sessions.

Broadly, the PDCP layer 220 provides multiplexing between different radio bearers and logical channels. The PDCP layer 220 also provides header compression for upper layer data packets to reduce radio transmission overhead, security by ciphering the data packets, and handover support for UEs between network devices or base stations. The RLC layer 215 provides segmentation and reassembly of upper layer data packets, retransmission of lost data packets, and reordering of data packets to compensate for out-of-order reception due to HARQ. The RLC layer 215 passes data to the MAC layer 210 as logical channels during transmit operations.

A logical channel defines what type of information is being transmitted over the air interface (e.g., user traffic, control channels, broadcast information, etc.). In some aspects, two or more logical channels may be combined into a logical channel group (LCG). By comparison, the transport channel defines how information is being transmitted over the air interface (e.g., encoding, interleaving, etc.) and the physical channel defines where information is being transmitted over the air interface (e.g., which symbols of the slot, subframe, fame, etc., are carrying the information).

The MAC layer 210 may manage aspects of the mapping between a logical channel and a transport channel, multiplexing of MAC service data units (SDUs) from logical channel(s) onto the transport block (TB) to be delivered to L1 on transport channels, HARQ based error correction, and the like. The MAC layer 210 is also responsible for allocating the various radio resources (e.g., resource blocks) in one cell among the UEs (at the network side). The MAC layer 210 may also support aspects of HARQ operations. The MAC layer 210 formats and sends the logical channel data to the physical layer (e.g., L1) as transport channels in one or more TBs.

In the control plane, the radio protocol architecture for the UE and base station is substantially the same for the L1 and the L2, with the exception that there is no header compression function for the control plane. The control plane also includes a RRC layer 225 in L3. The RRC layer 225 is responsible for obtaining radio resources (i.e., radio bearers) and for configuring the lower layers using RRC signaling between the base station and the UE. The RRC layer 225 may also manage one or more aspects of security and/or integrity verification.

According to some techniques, various functions of the PDCP layer 220 may include PDU reordering. For example, once a PDCP reordering timer expires, the PDCP layer 220 flushes all of the PDUs up to the received reorder (RX_REORDER) and the PDUs with a consecutive count (e.g., consecutive PDU SNs) starting from the RX_REORDER. A receive deliver (RX_DELIV) value may then be updated to the first PDCP SDU count that has not been delivered to upper layers, with the COUNT value being set to the RX-REORD. However, this process does not stop an RLC receive entity (e.g., RLC layer 215) from requesting retransmission of RLC PDUs associated with the PDCP PDUs with COUNT RX_DELIV (e.g., RLC layer 215 moves its receiving window forward after the missing PDU are received). Even if the retransmission attempt at the RLC layer 215 was successful, the PDCP receive entity (e.g., PDCP layer 220) may drop the PDUs as per the receive window operation. If the dropped PDU exceeds more than half the PDCP receiving window, the PDCP count will be mismatched between the receiving device and the network, which may cause a deciphering failure at the receiving device and, in some instances, radio link failure. This will negatively impact the overall throughput as well as unnecessary bandwidth waste and power consumption.

Accordingly, aspects of the described techniques provide a mechanism where the PDCP layer 220 (which may be referred to as a second operational layer of the receiving device in this context) may update the reception buffer (e.g., the receive window) of the RLC layer 215 (which may be referred to as a first operational layer of the receiving device in this context). For example, at least some PDUs within a set of PDUs may be received by the RLC layer 215. The RLC layer 215 may perform various functions with the PDUs, as is described above. Accordingly, the RLC layer 215 may provide or otherwise pass the PDUs up to the PDCP layer 220 for further processing during receive operations. However, in some instances there may be a gap in the PDU SNs due to missing PDU(s). The missing PDU(s) may be absent due to a recovery error, a high block level error rate (BLER), and the like.

The PDCP layer 220 (e.g., the second operational layer of the receiving device) may receive the PDUs from the RLC layer 215. That is, the PDCP layer 220 may receive one or more the PDUs within the set of PDUs, e.g., may receive the PDUs received by the RLC layer 215, which may include one or more sequence or SN gaps due to missing PDU(s). The PDCP layer 220 may identify the sequence gap associated with a missing PDU, e.g., may determine that, at least for a particular radio access technology, the SNs of the PDUs received from the RLC layer 215 include one or more holes associated with missing PDUs.

In some aspects, the PDCP layer 220 may also identify or otherwise determine that a triggering condition associated with the missing PDU, the receiving device, and/or with the set of PDUs has occurred. For example, PDCP layer 220 may determine that a reordering timer (e.g., t-reordering timer) has expired, that the memory or storage limit at the receiving device has been reached, and the like. Accordingly, the PDCP layer 220 may transmit or otherwise provide an indication to the RLC layer 215 to update its reception buffer (e.g., the lower edge of the receive window) to a last received PDU within the set of PDUs. For example, the PDCP layer 220 may identify or otherwise determine the SN of the last PDU that was delivered to upper layers (e.g., to a third operational layer of the receiving device, such as SDAP layer 235, RRC layer 225, IP layer 230, etc.). The PDCP layer 220 may transmit or otherwise provide a signal to the RLC layer 215 indicating the update value for the reception buffer according to the SN of the last PDU that was provided upstream. Accordingly, the RLC layer 215 may update the reception buffer based, at least in some aspects, on the indication received from the PDCP layer 220 and the occurrence of the triggering condition. In some aspects, the RLC layer 215 may also reset a NACK list to exclude the missing PDU in response to the indication and/or the update of the reception buffer.

Accordingly, aspects of the described techniques may include the PDCP layer 220 (e.g., the second operational layer of the receiving device) updating the reception buffer (e.g., the receive window) of the RLC layer 215 to skip missing PDUs. This may avoid or at least reduce the number of RLC retransmissions (e.g., HARQ retransmissions) performed by the RLC layer 215, which may conserve various resources of the receiving device and the network.

Thus, aspects of the present disclosure provide mechanism(s) where the PDCP layer 220 (e.g., a NR PDCP receive entity) indicates to the RLC layer 215 (e.g., a RLC receive entity(s)) the RLC SN(s) associated with the last PDCP PDU that was delivered to upper layers when RX_DELIV is updated, e.g., during t-reordering expiry (such as expiration of a reordering timer) the RLC SN associated with the PDCP PDU with COUNT RX_DELIV. While t-reordering expiry is one such triggering condition, e.g., deliver PDCP PDUs with a gap, the receiving device may have multiple factors that act as triggering conditions for a flush including, but not limited to, memory restriction in the receiving device. The RLC receive entity may force move its receive window's lower edge (RX_NEXT in the case of a NR RLC layer or VR(R) in the case of an LTE RLC layer) to the value received from the PDCP layer 220 if it is within the RLC receive window. As part of this update, the RLC layer 215 may update the NACK list to remove the previously NACKd RLC PDUs. This may cause the RLC transmit entity in the transmitting device to move the transmit window and hence new PDUs may be transmitted, which may improve over-the-air bandwidth efficiency. In the case of evolved UTRAN (E-UTRAN) NR dual connectivity (DC) (EN/NE-DC) radio bearers when both LTE RLC layer(s) and NR RLC layer(s) are delivering PDUs to a NR PDCP layer, the described techniques applies to both the technology RLCs. The NR PDCP layer may provide the radio access technology (RAT) specific last RLC SN associated in the flush procedure at the NR PDCP layer. Accordingly, the unnecessary retransmissions are avoided/reduced, which helps to improve downlink throughput, stability at the receiving device, and saves power/bandwidth resources.

Figure 3A:
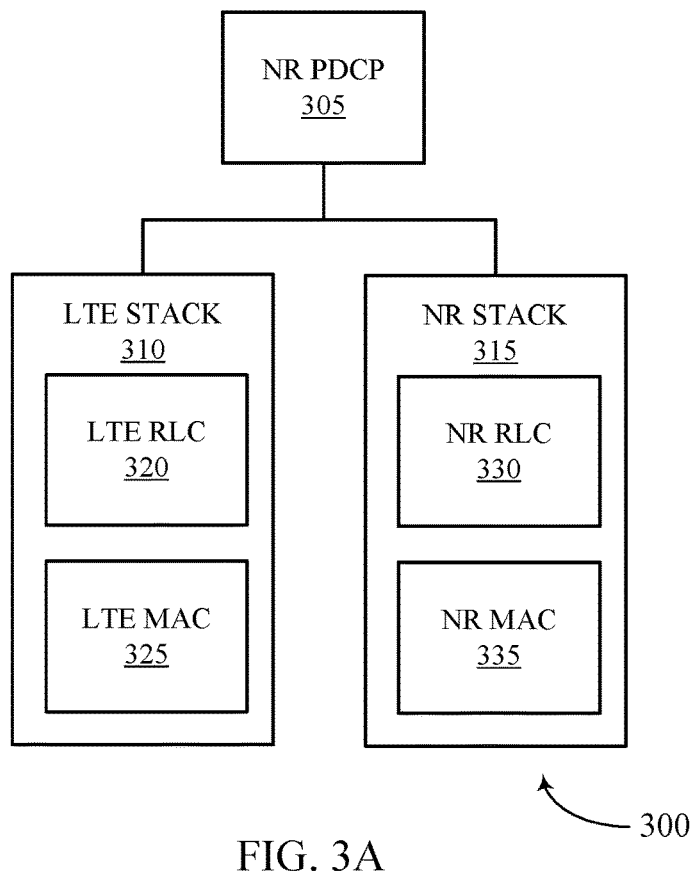
FIG. 3A illustrates an example of a protocol stack that supports methods to reduce RLC retransmission, in accordance with one or more aspects of the present disclosure.
Figure 3B:
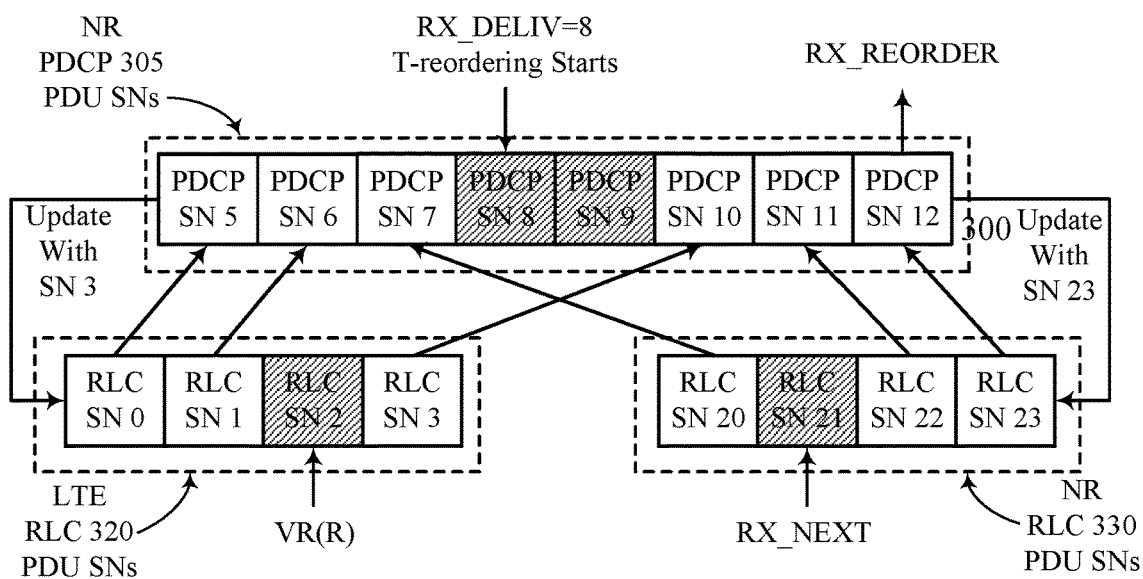
FIG. 3B illustrates examples of corresponding PDU SNs for various layers of the protocol stack, in accordance with one or more aspects of the present disclosure.

FIG. 3A illustrates an example of a protocol stack 300 that supports methods to reduce RLC retransmission, in accordance with one or more aspects of the present disclosure. In some examples, protocol stack 300 may implement aspects of wireless communication system 100 and/or protocol stack 200. Aspects of protocol stack 300 may be implemented by a receiving device, which may be an example of a UE and/or base station, as are described herein. Aspects of protocol stack 300 illustrate an example NR PDCP layer 305, LTE stack 310, and NR stack 315. FIG. 3B illustrates examples of the corresponding PDU SNs 301 for the NR PDCP layer 305, LTE stack 310, and NR stack 315, according to aspects of the described techniques.

Protocol stack 300 may include an NR PDCP layer 305, an LTE stack 310 that includes an LTE RLC layer 320 and an LTE MAC layer 325, and an NR stack 315 that includes an NR RLC layer 330 and an NR MAC layer 335. Each of the operational layers of protocol stack 300 may perform functions similar to the corresponding operational layers of protocol stack 200, but for the respective radio access technologies. That is, the LTE RLC layer 320 and the LTE MAC layer 325 may perform functions similar to the corresponding operational layers of protocol stack 200 for LTE-based communications while the NR RLC layer 330 and the NR MAC layer 335 may perform the corresponding functions for NR-based communications. Moreover, it is to be understood that there may be additional operational layers implemented in a receiving device, such as lower layers (e.g., physical layers) and/or upper layer (e.g., RRC layers, IP layers, etc.). In some aspects, the NR PDCP layer 305 may be considered the second operational layer of the receiving device in this context. Moreover, at least one or both of the LTE RLC layer 320 and the NR RLC layer 330 may be considered the first operational layer of the receiving device in this context.

More particularly, protocol stack 300 illustrates an example of an EN/NE-DC radio bearer scenario where both LTE RLC layer(s) (e.g., LTE stack 310) and NR RLC layer(s) (e.g., NR stack 315) are delivering PDUs to a NR PDCP layer 305. As discussed, aspects of the described techniques applies to both the technology RLCs. The NR PDCP layer 305 may provide the radio access technology-specific last RLC SN associated in the flush procedure to the respective RLC layer in response to identifying the sequence gap and the occurrence of the triggering condition.

That is, each RLC layer in the LTE stack 310 and the NR stack 315 may receive one or more the PDUs within a set of PDUs, e.g., may receive PDUs that include one or more missing PDUs. The LTE RLC layer 320 and the NR RLC layer 330 illustrated in FIG. 3B may each pass or otherwise provide their respective received PDUs to the NR PDCP layer 305. In some aspects, the SNs associated with the received PDUs may not be consecutive or otherwise coordinated between the respective radio access technologies. That is, the SNs associated with the LTE PDUs may be different from, or may not be coordinated with respect to, the SNs associated with the NR PDUs that are passed to the NR PDCP layer 305. In the example 301 illustrated in FIG. 3B, the NR stack 315 may be providing PDUs to the NR PDCP layer 305 using SNs in the range of 20-23 (with the NR stack 315 missing SN 21) whereas the LTE stack 310 may be providing PDUs to the NR PDCP layer 305 using SNs in the range of 0-3 (with the LTE stack 310 missing SN 2).

The NR PDCP layer 305 may maintain tracking functions for PDUs associated with the NR and LTE radio access technologies. In the illustrated example of FIG. 3B, the NR PDCP layer 305 may renumber the SNs received from the RLC layers for tracking purposes. For example and for LTE stack 310, RLC SN 0 corresponds to PDCP SN 5, RLC SN 1 corresponds to PDCP SN 6, missing RLC SN 2 corresponds to PDCP SN 8, and RLC SN 3 corresponds to PDCP SN 10. For NR stack 315, RLC SN 20 corresponds to PDCP SN 7, missing RLC SN 21 corresponds to PDCP SN 9, RLC SN 22 corresponds to PDCP SN 11, and RLC SN 23 corresponds to PDCP SN 12. Based on RLC SN 2 being a missing SN, the LTE stack 310 may set its VR(R) to 2. Based on RLC SN 21 being a missing SN, the NR stack 315 may set its RX_NEXT to 21.

For one or both of the different radio access technologies, the NR PDCP layer 305 may determine or otherwise identify a sequence gap associated with a missing PDU. For example, the NR PDCP layer 305 may identify a sequence gap (e.g. a missing PDU SN within the set of PDU SN's) of NR PDCP PDU SN 9 (corresponding to RLC SN 21) from the NR RLC layer 330 as well as a sequence gap of LTE PDU SN 8 (corresponding to RLC SN 2) from the LTE RLC layer 320. Based on identifying the sequence gap, the NR PDCP layer 305 may set its RX_DELIV value to 8 and initiate a reordering timer (e.g., T-reordering timer).

Again, the NR PDCP layer 305 may also determine or otherwise identify that the triggering condition associated with a missing PDU and/or the receiving device may have occurred. For example, the NR PDCP layer 305 may (for one or both of the respective radio access technologies) determine that a reordering timer has expired, that memory is full, etc., which may act as the triggering condition upon which the NR PDCP layer 305 flushes its buffer. In the example 301 illustrated in FIG. 3B, the triggering condition may correspond to the reordering timer expiring while or after processing PDCP SN 12, which initiates the reordering (or flush) event.

Based on the triggering condition occurring, the NR PDCP layer 305 may transmit or otherwise provide an indication to update the reception buffer (e.g., the receive window) of the RLC layer for the radio access technology associated with the missing PDU. The NR PDCP layer 305 may deliver PDCP SNs 10, 11, and 12 to upper layers and then update the RLC entities with the respective last RCL SN. For example, the NR PDCP layer 305 may transmit or otherwise provide a signal to the LTE RLC layer 320 in the instance where the missing PDU is an LTE PDU and/or transmit or otherwise provide a signal to the NR RLC layer 330 in the instance where the missing PDU is an NR PDU. For example, the NR PDCP layer 305 may provide the RLC SN associated with its COUNT RX_DELIV value to the respective RLC layer associated with the last PDCP PDU SN which was provided to upper layers (e.g., to an RRC layer, IP layer, etc.). For example, this may include the NR PDCP layer 305 indicating a value of 3 to the LTE RLC layer 320 and a value of 23 to the NR RLC layer 330. In some aspects, the COUNT RX_DELIV corresponds to the last PDCP PDU SN which was delivered to upper layers by the NR PDCP layer 305. In the LTE example, this may indicate that the NR PDCP layer 305 has provided RLC SNs 0-3 to upper layers, e.g., skipping or giving up on RLC SN 2 (corresponding to PDCP SN 8). In the NR example, this may indicate that the NR PDCP layer 305 has provided RLC SNs 20-23 to upper layers, e.g., skipping or giving up on RLC SN 21 (corresponding to PDCP SN 9).

Accordingly, the respective RLC layer may receive or otherwise identify the indication from the NR PDCP layer 305 (e.g., the RLC SN value) and update its reception buffer in response to the indication. For example, each RLC layer may maintain a receive window containing PDU SNs as part of its PDU management functions. The receive window may generally include the PDU SNs which have been passed up to the NR PDCP layer 305 and/or are missing RLC SN(s). The RLC layer may use the PDU SNs (e.g., RLC SNs) in the receive window (e.g., reception buffer) as part of its ARQ function, e.g., to determine which PDU SNs have been or are expected to be received from the transmitting device. In the illustrated example, this may include the LTE RLC layer 320 maintaining a receive window having PDU SNs of 0-3 and the NR RLC layer 330 maintaining a receive window having PDU SNs of 20-23. Based on the indication from the NR PDCP layer 305 (e.g., the RLC SN value indicated based on the missing PDU SN), each RLC layer may update its reception buffer based on the update value indicated by the NR PDCP layer 305. For example, the LTE RLC layer 320 may update the receive window (or the bottom/beginning edge) to start at 3 and the NR RLC layer 330 may update its receive window (or the bottom/beginning edge) to 23. This may avoid or reduce RLC retransmissions of the missing PDU(s) in order to conserve resources, reduce power consumption, and the like.

Figure 4:
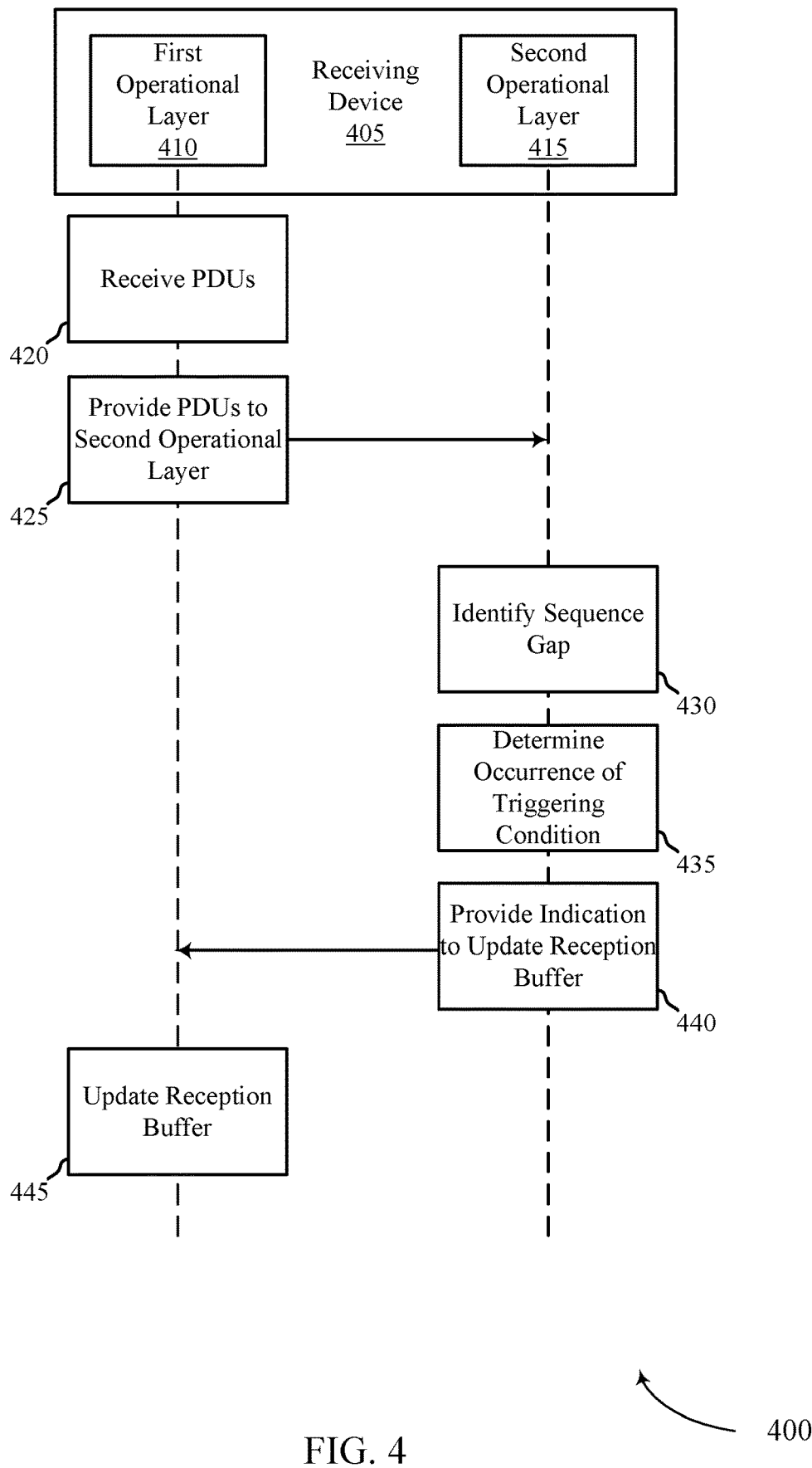
FIG. 4 illustrates an example of a process that supports methods to reduce RLC retransmission, in accordance with one or more aspects of the present disclosure.

FIG. 4 illustrates an example of a process 400 that supports methods to reduce RLC retransmission, in accordance with one or more aspects of the present disclosure. In some examples, process 400 may implement aspects of wireless communication system 100, protocol stack 200, and/or protocol stack 300. Aspects of process 400 may be implemented by a receiving device 405, which may be an example of a UE and/or a base station as are described herein. More particularly, aspects of process 400 may be implemented by a first operational layer 410 (e.g., an RLC layer) and a second operational layer 415 (e.g., a PDCP layer) of receiving device 405.

At 420, the first operational layer 410 may receive one or more PDUs within a set of PDUs. For example, the first operational layer 410 may receive the PDUs from the lower layer (e.g., a MAC layer of receiving device 405). The set of PDUs may refer to a series of PDUs having sequential SNs. The first operational layer 410 may receive a portion of the set of PDUs in that at least one or more of the PDUs are missing.

In the EN/NE-DC scenario, the first operational layer may refer to an LTE RLC layer and/or an NR RLC layer. In this scenario, each RLC layer may independently feed PDUs to the second operational layer (e.g., an NR PDCP layer).

At 425, the first operational layer 410 may transmit or otherwise provide the received PDUs to the second operational layer 415 of receiving device 405. As discussed, the second operational layer 415 may be a higher layer (e.g., within a protocol stack) than the first operational layer 410.

At 430, the second operational layer 415 may determine or otherwise identify a sequence gap associated with missing PDU from the set of PDUs. For example, the second operational layer 415 may identify one or more missing SNs within the PDUs received from the first operational layer 410. Accordingly, the second operational layer 415 may monitor and/or track missing PDUs received from the first operational layer 410.

At 435, the second operational layer 415 may determine that a triggering condition has occurred. Broadly, in some examples of triggering condition may refer to any trigger initiating a flush of the receive window of the first operational layer 410. For example, the second operational layer 415 may initiate a reordering timer upon determining or otherwise identifying the missing PDU. In one example, the triggering condition may refer to the expiration of the reordering timer. In another example, a storage limit for memory of the receiving device 405 (at the first operational layer 410 and/or the second operational layer 415) may be reached. In this example, reaching the storage limit capacity may serve as the triggering condition for the second operational layer 415.

At 440, the second operational layer 415 may transmit or otherwise provide an indication to the first operational layer 410 to update the reception buffer of the first operational layer 410. For example, the second operational layer 415 may provide the indication for the first operational layer to update the reception buffer to a last received PDU within the set of PDUs. For example, the second operational layer 415 may identify an SN of the last PDU within the set of PDUs that was delivered to a third operational layer (not shown) of the receiving device above the second operational layer 415. Accordingly, the second operational layer 415 may provide a signal to the first operational layer 410 indicating an update value for the reception buffer of the first operational layer 410 according to the SN of the last PDU that was delivered to the third operational layer.

At 445, the first operational layer 410 may update its reception buffer according to the indication to update received from the second operational layer 415 of receiving device 405.

Figure 5:
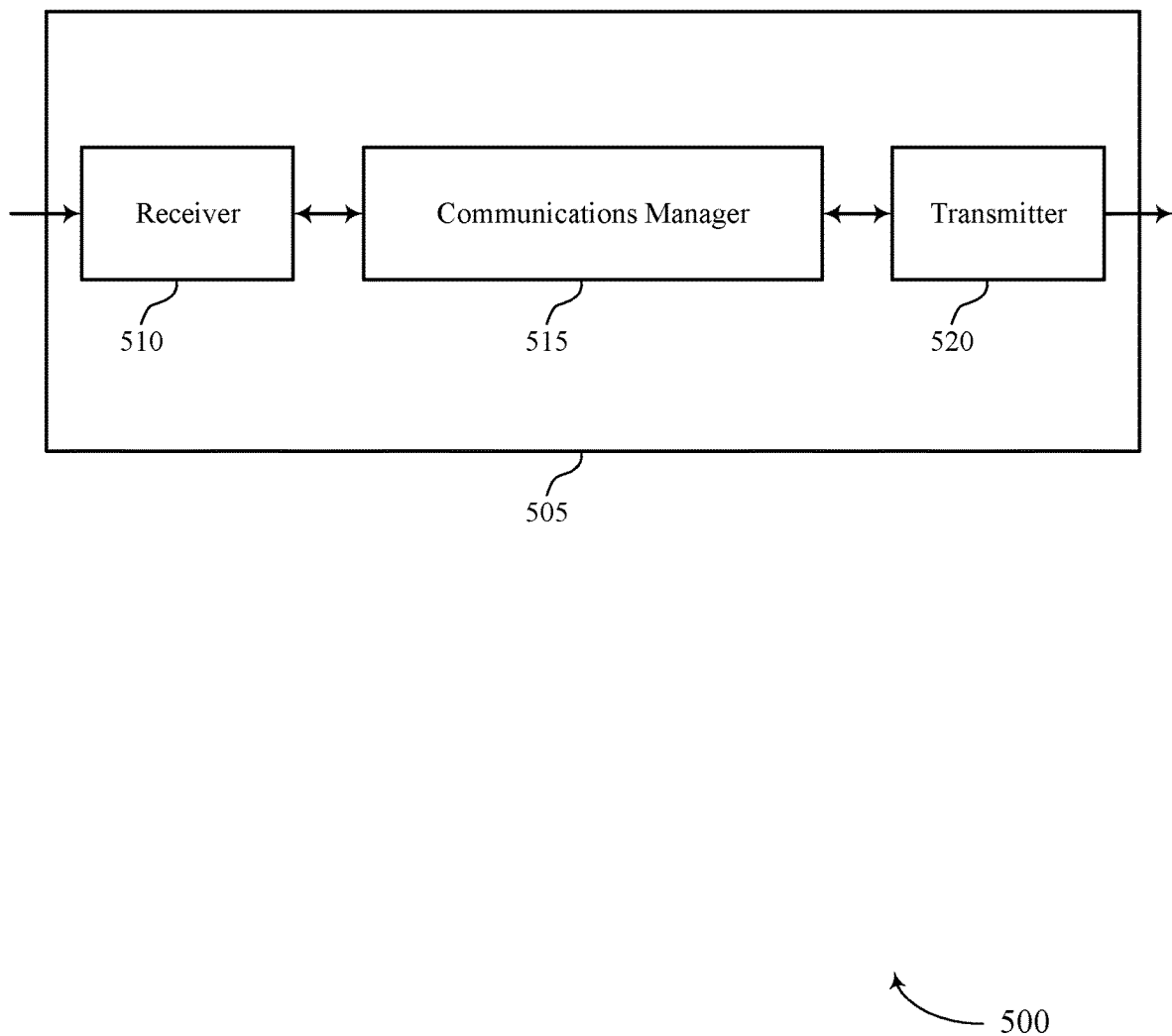
FIGS. 5 and 6 show block diagrams of devices that support methods to reduce RLC retransmission, in accordance with one or more aspects of the present disclosure.

FIG. 5 shows a block diagram 500 of a device 505 that supports methods to reduce RLC retransmission, in accordance with one or more aspects of the present disclosure. The device 505 may be an example of aspects of a UE 115 or base station 105 as described herein. The device 505 may include a receiver 510, a communications manager 515, and a transmitter 520. The device 505 may also include a processor. Each of these components may be in communication with one another (e.g., via one or more buses).

Receiver 510 may receive information such as packets, user data, or control information associated with various information channels (e.g., control channels, data channels, and information related to methods to reduce RLC retransmission, etc.). Information may be passed on to other components of the device 505. The receiver 510 may be an example of aspects of the transceiver 820 or 920 as described with reference to FIGS. 8 and 9. The receiver 510 may utilize a single antenna or a set of antennas.

The communications manager 515 may receive, at a first operational layer of the receiving device, one or more PDUs within a set of PDUs, identify, at a second operational layer of the receiving device, a sequence gap associated with a missing PDU from the set of PDUs, the first operational layer being a lower operational layer of the receiving device than the second operational layer, determine, at the second operational layer, that a triggering condition associated with the missing PDU has occurred, and provide, by the second operational layer and based on the triggering condition occurring, an indication to update a reception buffer of the first operational layer to a last received PDU of the set of PDUs. The communications manager 515 may also receive, at a first operational layer of the receiving device, one or more PDUs within a set of PDUs, provide the received PDUs to a second operational layer of the receiving device, the first operational layer being a lower operational layer of the receiving device than the second operational layer, identify an indication from the second operational layer to update a reception buffer of the first operational layer based on a sequence gap associated with a missing PDU from the set of PDUs, and update the reception buffer based on the indication. The communications manager 515 may be an example of aspects of the UE and BS communications managers 810 or 910, respectively, as described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

Transmitter 520 may transmit signals generated by other components of the device 505. In some examples, the transmitter 520 may be collocated with a receiver 510 in a transceiver module. For example, the transmitter 520 may be an example of aspects of the transceiver 820 or 920 as described with reference to FIGS. 8 and 9. The transmitter 520 may utilize a single antenna or a set of antennas.

Figure 6:
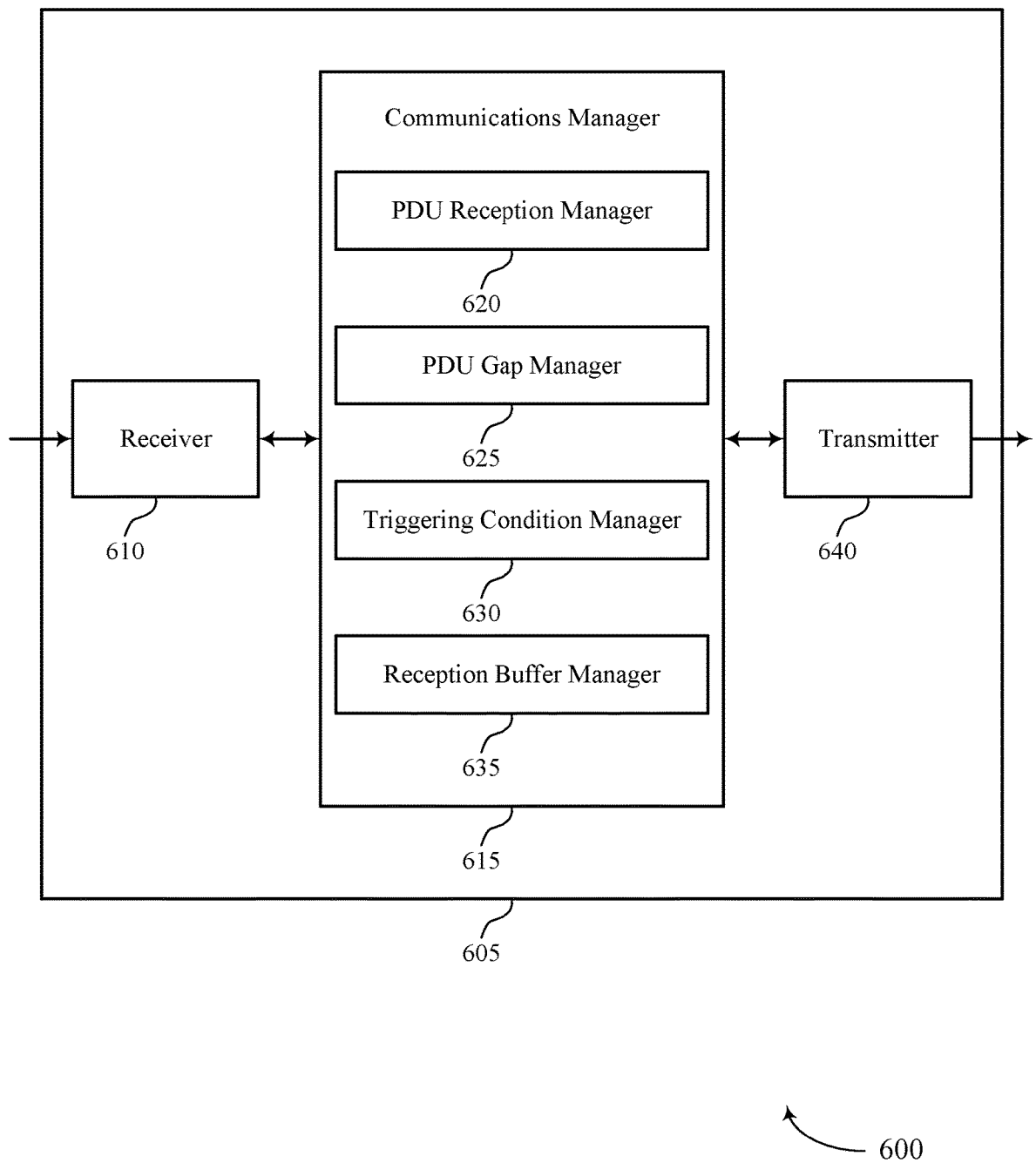

FIG. 6 shows a block diagram 600 of a device 605 that supports methods to reduce RLC retransmission, in accordance with one or more aspects of the present disclosure. The device 605 may be an example of aspects of a device 505, a UE 115, or a base station 105 as described herein. The device 605 may include a receiver 610, a communications manager 615, and a transmitter 640. The device 605 may also include a processor. Each of these components may be in communication with one another (e.g., via one or more buses).

Receiver 610 may receive information such as packets, user data, or control information associated with various information channels (e.g., control channels, data channels, and information related to methods to reduce RLC retransmission, etc.). Information may be passed on to other components of the device 605. The receiver 610 may be an example of aspects of the transceiver 820 or 920 as described with reference to FIGS. 8 and 9. The receiver 610 may utilize a single antenna or a set of antennas.

The communications manager 615 may be an example of aspects of the communications manager 515 as described herein. The communications manager 615 may include a PDU reception manager 620, a PDU gap manager 625, a triggering condition manager 630, and a reception buffer manager 635. The communications manager 615 may be an example of aspects of the UE and BS communications managers 810 or 910, respectively, as described herein.

The PDU reception manager 620 may receive, at a first operational layer of the receiving device, one or more PDUs within a set of PDUs.

The PDU gap manager 625 may identify, at a second operational layer of the receiving device, a sequence gap associated with a missing PDU from the set of PDUs, the first operational layer being a lower operational layer of the receiving device than the second operational layer.

The triggering condition manager 630 may determine, at the second operational layer, that a triggering condition associated with the missing PDU has occurred.

The reception buffer manager 635 may provide, by the second operational layer and based on the triggering condition occurring, an indication to update a reception buffer of the first operational layer to a last received PDU of the set of PDUs.

The PDU reception manager 620 may receive, at a first operational layer of the receiving device, one or more PDUs within a set of PDUs and provide the received PDUs to a second operational layer of the receiving device, the first operational layer being a lower operational layer of the receiving device than the second operational layer.

The triggering condition manager 630 may identify an indication from the second operational layer to update a reception buffer of the first operational layer based on a sequence gap associated with a missing PDU from the set of PDUs.

The reception buffer manager 635 may update the reception buffer based on the indication.

Transmitter 640 may transmit signals generated by other components of the device 605. In some examples, the transmitter 640 may be collocated with a receiver 610 in a transceiver module. For example, the transmitter 640 may be an example of aspects of the transceiver 820 or 920 as described with reference to FIGS. 8 and 9. The transmitter 640 may utilize a single antenna or a set of antennas.

Figure 7:
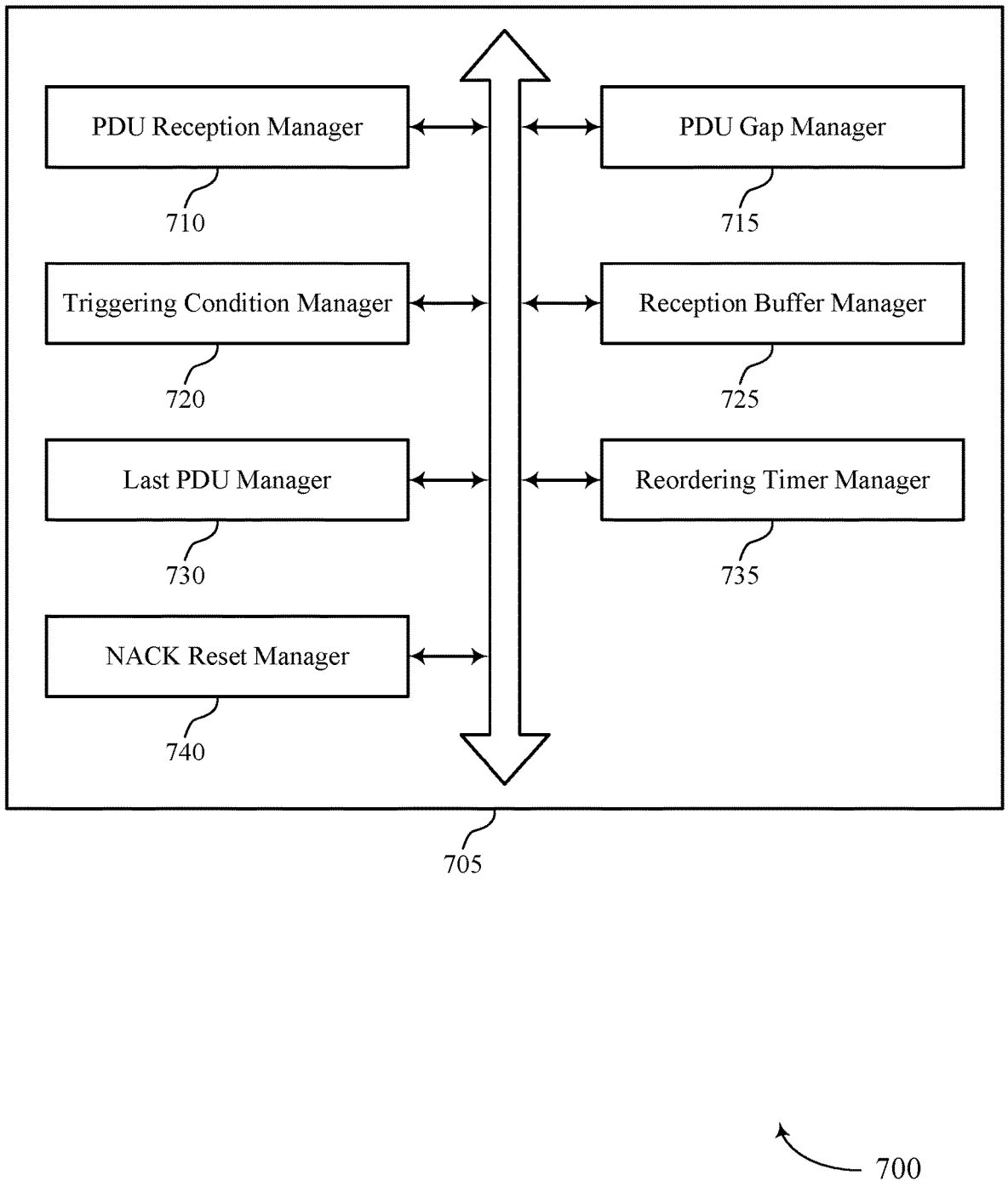
FIG. 7 shows a block diagram of a communications manager that supports methods to reduce RLC retransmission, in accordance with one or more aspects of the present disclosure.

FIG. 7 shows a block diagram 700 of a communications manager 705 that supports methods to reduce RLC retransmission, in accordance with one or more aspects of the present disclosure. The communications manager 705 may be an example of aspects of a communications manager 515, a communications manager 615, a UE communications manager 810, or a BS communications manager 910, described herein. The communications manager 705 may include a PDU reception manager 710, a PDU gap manager 715, a triggering condition manager 720, a reception buffer manager 725, a last PDU manager 730, a reordering timer manager 735, and a NACK reset manager 740. Each of these modules may communicate, directly or indirectly, with one another (e.g., via one or more buses).

The PDU reception manager 710 may receive, at a first operational layer of the receiving device, one or more PDUs within a set of PDUs. In some examples, the PDU reception manager 710 may receive, at a first operational layer of the receiving device, one or more PDUs within a set of PDUs.

In some examples, the PDU reception manager 710 may provide the received PDUs to a second operational layer of the receiving device, the first operational layer being a lower operational layer of the receiving device than the second operational layer. In some examples, the PDU reception manager 710 may provide a first signal to the LTE RLC layer indicating a first update value for the reception buffer of the LTE RLC layer.

In some examples, the PDU reception manager 710 may provide a second signal to the NR RLC layer indicating a second update value for the reception buffer of the NR RLC layer. In some cases, the first operational layer includes at least one of a LTE RLC layer, or a NR RLC layer, or a combination thereof. In some cases, the second operational layer includes a PDCP layer. In some cases, the first operational layer includes at least one of a LTE RLC layer, or a NR RLC layer, or a combination thereof. In some cases, the second operational layer includes a PDCP layer.

The PDU gap manager 715 may identify, at a second operational layer of the receiving device, a sequence gap associated with a missing PDU from the set of PDUs, the first operational layer being a lower operational layer of the receiving device than the second operational layer.

The triggering condition manager 720 may determine, at the second operational layer, that a triggering condition associated with the missing PDU has occurred. In some examples, the triggering condition manager 720 may identify an indication from the second operational layer to update a reception buffer of the first operational layer based on a sequence gap associated with a missing PDU from the set of PDUs. In some cases, the triggering condition includes at least one of expiration of a reordering timer associated with the missing PDU, or reaching a storage limit for a memory associated with the set of PDUs, or a combination thereof.

The reception buffer manager 725 may provide, by the second operational layer and based on the triggering condition occurring, an indication to update a reception buffer of the first operational layer to a last received PDU of the set of PDUs. In some examples, the reception buffer manager 725 may update the reception buffer based on the indication.

In some cases, the reception buffer of the first operational layer includes at least one of a RX_NEXT reception buffer, or a VR(R) reception buffer, or a combination thereof.

The last PDU manager 730 may identify a sequence number of a last PDU within the set of PDUs that was delivered to a third operational layer that is a higher operational layer of the receiving device than the second operational layer. In some examples, the last PDU manager 730 may provide a signal to the first operational layer indicating an update value for the reception buffer of the first operational layer based on the sequence number of the last PDU.

In some examples, the last PDU manager 730 may receive a signal from the second operational layer indicating an update value for the reception buffer of the first operational layer based on a sequence number of a last PDU that the second operational layer delivered to a third operational layer that is a higher operational layer of the receiving device than the second operational layer.

The reordering timer manager 735 may initiate a reordering timer upon identifying the sequence gap associated with the missing PDU.

The NACK reset manager 740 may reset a NACK list to exclude the missing PDU based on the updated reception buffer.

Figure 8:
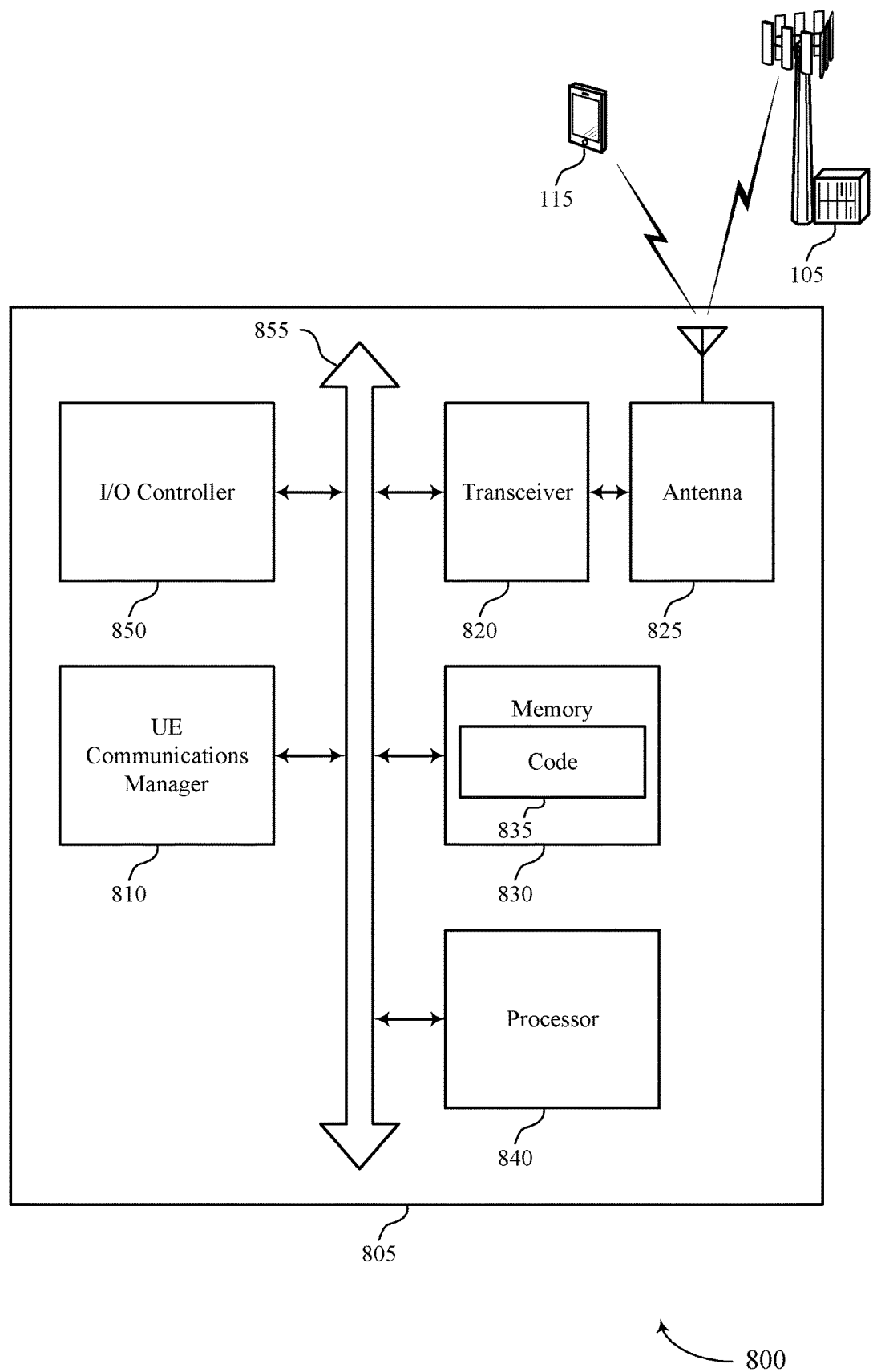
FIG. 8 shows a diagram of a system including a UE that supports methods to reduce RLC retransmission, in accordance with one or more aspects of the present disclosure.

FIG. 8 shows a diagram of a system 800 including a device 805 that supports methods to reduce RLC retransmission, in accordance with one or more aspects of the present disclosure. The device 805 may be an example of or include the components of device 505, device 605, or a UE 115 as described herein. The device 805 may include components for bi-directional voice and data communications including components for transmitting and receiving communications, including a UE communications manager 810, a transceiver 820, an antenna 825, memory 830, a processor 840, and an I/O controller 850. These components may be in electronic communication via one or more buses (e.g., bus 855).

The UE communications manager 810 may receive, at a first operational layer of the receiving device, one or more PDUs within a set of PDUs, identify, at a second operational layer of the receiving device, a sequence gap associated with a missing PDU from the set of PDUs, the first operational layer being a lower operational layer of the receiving device than the second operational layer, determine, at the second operational layer, that a triggering condition associated with the missing PDU has occurred, and provide, by the second operational layer and based on the triggering condition occurring, an indication to update a reception buffer of the first operational layer to a last received PDU of the set of PDUs. The UE communications manager 810 may also receive, at a first operational layer of the receiving device, one or more PDUs within a set of PDUs, provide the received PDUs to a second operational layer of the receiving device, the first operational layer being a lower operational layer of the receiving device than the second operational layer, identify an indication from the second operational layer to update a reception buffer of the first operational layer based on a sequence gap associated with a missing PDU from the set of PDUs, and update the reception buffer based on the indication.

Transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM, ROM, or a combination thereof. The memory 830 may store computer-readable code 835 including instructions that, when executed by a processor (e.g., the processor 840) cause the device to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting methods to reduce RLC retransmission).

The I/O controller 850 may manage input and output signals for the device 805. The I/O controller 850 may also manage peripherals not integrated into the device 805. In some cases, the I/O controller 850 may represent a physical connection or port to an external peripheral. In some cases, the I/O controller 850 may utilize an operating system such as iOS®, ANDROID®, MS-DOS®, MS-WINDOWS®, OS/2®, UNIX®, LINUX®, or another known operating system. In other cases, the I/O controller 850 may represent or interact with a modem, a keyboard, a mouse, a touchscreen, or a similar device. In some cases, the I/O controller 850 may be implemented as part of a processor. In some cases, a user may interact with the device 805 via the I/O controller 850 or via hardware components controlled by the I/O controller 850.

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
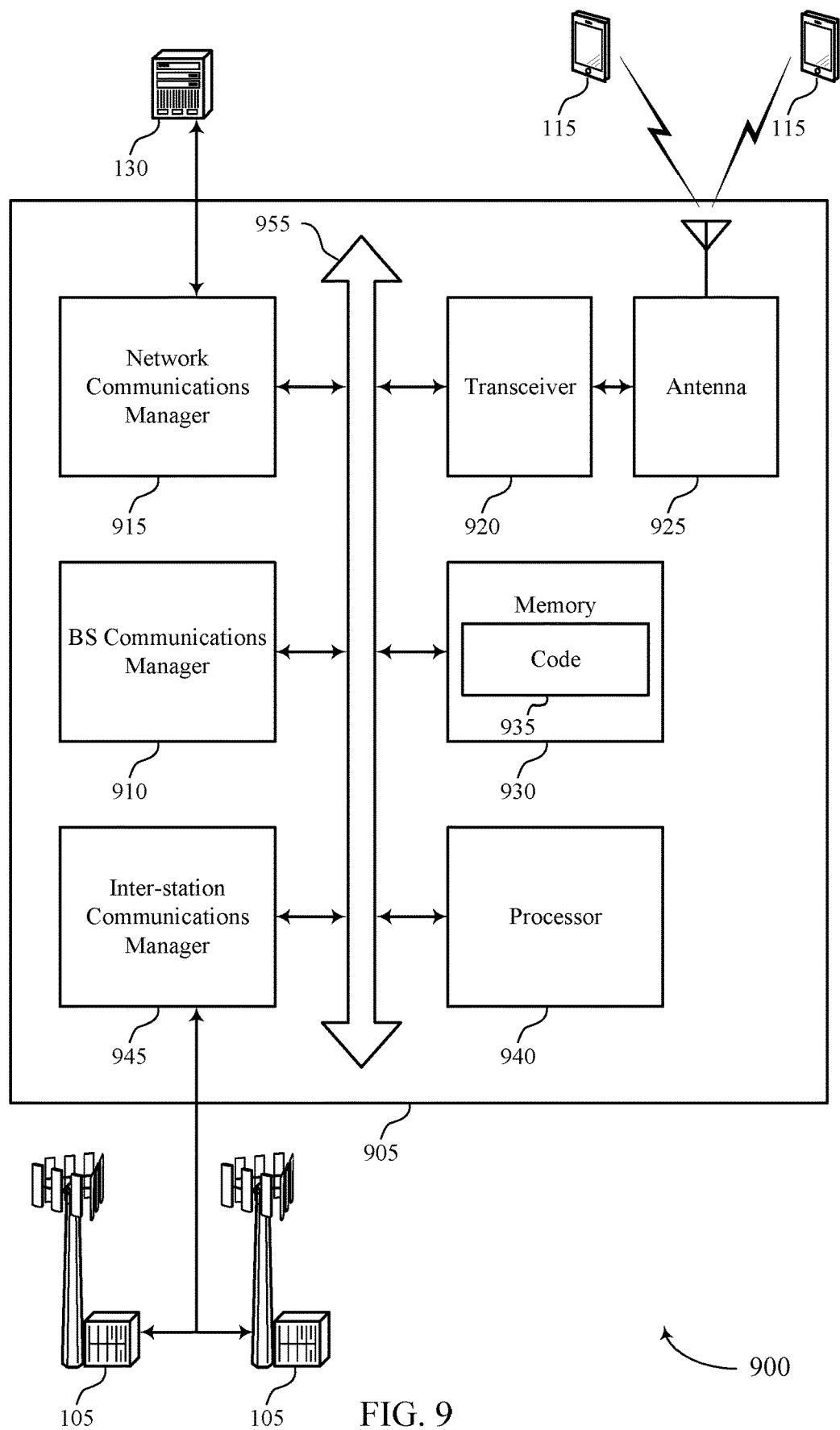
FIG. 9 shows a diagram of a system including a base station that supports methods to reduce RLC retransmission, in accordance with one or more aspects of the present disclosure.

FIG. 9 shows a diagram of a system 900 including a device 905 that supports methods to reduce RLC retransmission, in accordance with one or more aspects of the present disclosure. The device 905 may be an example of or include the components of device 505, device 605, or a base station 105 as described herein. The device 905 may include components for bi-directional voice and data communications including components for transmitting and receiving communications, including a BS communications manager 910, a network communications manager 915, a transceiver 920, an antenna 925, memory 930, a processor 940, and an inter-station communications manager 945. These components may be in electronic communication via one or more buses (e.g., bus 955).

The BS communications manager 910 may receive, at a first operational layer of the receiving device, one or more PDUs within a set of PDUs, identify, at a second operational layer of the receiving device, a sequence gap associated with a missing PDU from the set of PDUs, the first operational layer being a lower operational layer of the receiving device than the second operational layer, determine, at the second operational layer, that a triggering condition associated with the missing PDU has occurred, and provide, by the second operational layer and based on the triggering condition occurring, an indication to update a reception buffer of the first operational layer to a last received PDU of the set of PDUs. The BS communications manager 910 may also receive, at a first operational layer of the receiving device, one or more PDUs within a set of PDUs, provide the received PDUs to a second operational layer of the receiving device, the first operational layer being a lower operational layer of the receiving device than the second operational layer, identify an indication from the second operational layer to update a reception buffer of the first operational layer based on a sequence gap associated with a missing PDU from the set of PDUs, and update the reception buffer based on the indication.

Network communications manager 915 may manage communications with the core network (e.g., via one or more wired backhaul links). For example, the network communications manager 915 may manage the transfer of data communications for client devices, such as one or more UEs 115.

Transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM, ROM, or a combination thereof. The memory 930 may store computer-readable code 935 including instructions that, when executed by a processor (e.g., the processor 940) cause the device to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting methods to reduce RLC retransmission).

Inter-station communications manager 945 may manage communications with other base station 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, inter-station communications manager 945 may provide an X2 interface within an LTE/LTE-A wireless communication network technology to provide communication between base stations 105.

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
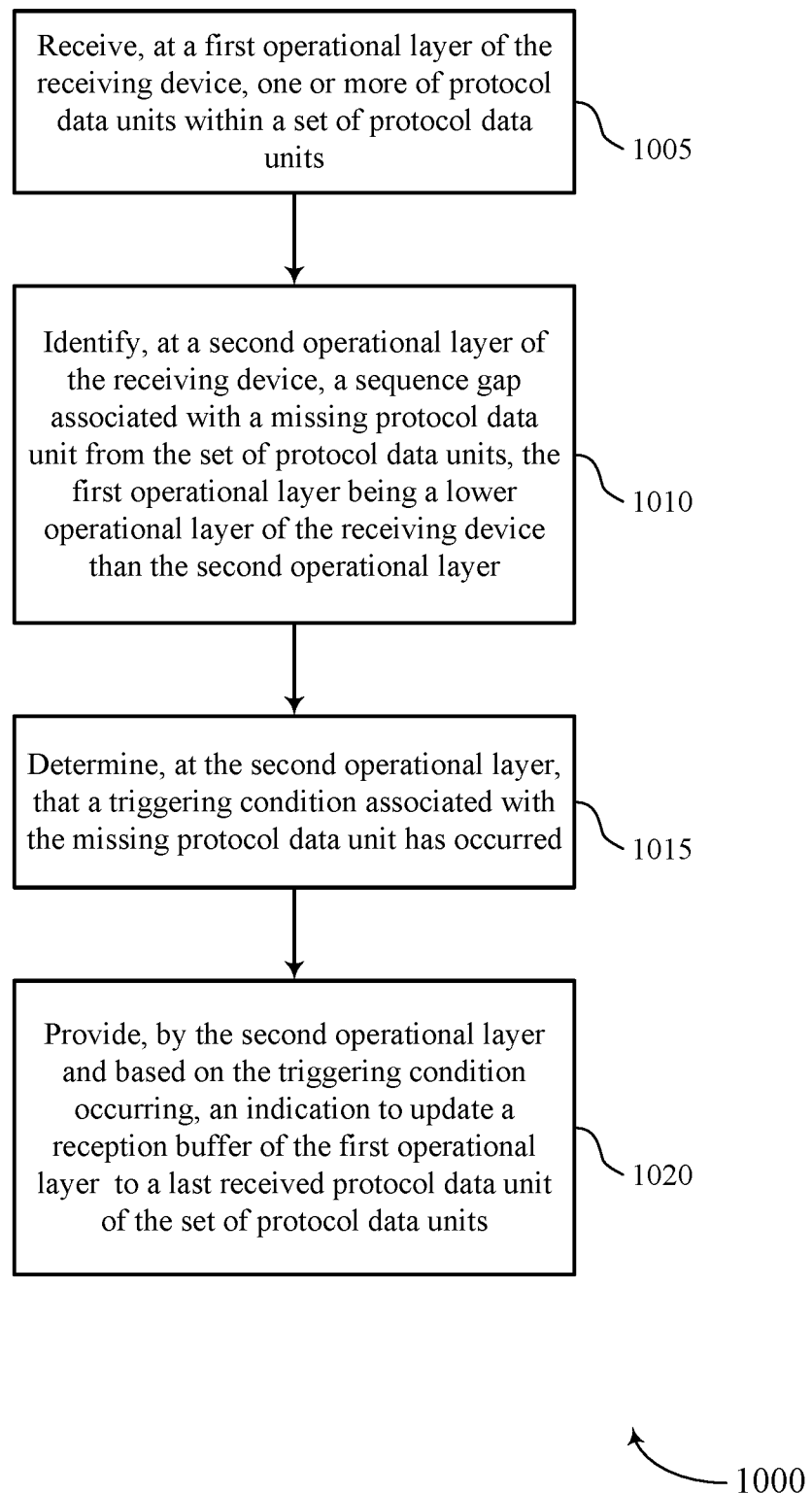
FIGS. 10 through 14 show flowcharts illustrating methods that support methods to reduce RLC retransmission, in accordance with one or more aspects of the present disclosure.

FIG. 10 shows a flowchart illustrating a method 1000 that supports methods to reduce RLC retransmission, in accordance with one or more aspects of the present disclosure. The operations of method 1000 may be implemented by a UE 115 or base station 105 or its components as described herein. For example, the operations of method 1000 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1005, the UE or base station may receive, at a first operational layer of the receiving device, one or more PDUs within a set of PDUs. The operations of 1005 may be performed according to the methods described herein. In some examples, aspects of the operations of 1005 may be performed by a PDU reception manager as described with reference to FIGS. 5 through 9.

At 1010, the UE or base station may identify, at a second operational layer of the receiving device, a sequence gap associated with a missing PDU from the set of PDUs, the first operational layer being a lower operational layer of the receiving device than the second operational layer. The operations of 1010 may be performed according to the methods described herein. In some examples, aspects of the operations of 1010 may be performed by a PDU gap manager as described with reference to FIGS. 5 through 9.

At 1015, the UE or base station may determine, at the second operational layer, that a triggering condition associated with the missing PDU has occurred. The operations of 1015 may be performed according to the methods described herein. In some examples, aspects of the operations of 1015 may be performed by a triggering condition manager as described with reference to FIGS. 5 through 9.

At 1020, the UE or base station may provide, by the second operational layer and based on the triggering condition occurring, an indication to update a reception buffer of the first operational layer to a last received PDU of the set of PDUs. The operations of 1020 may be performed according to the methods described herein. In some examples, aspects of the operations of 1020 may be performed by a reception buffer manager as described with reference to FIGS. 5 through 9.

Figure 11:
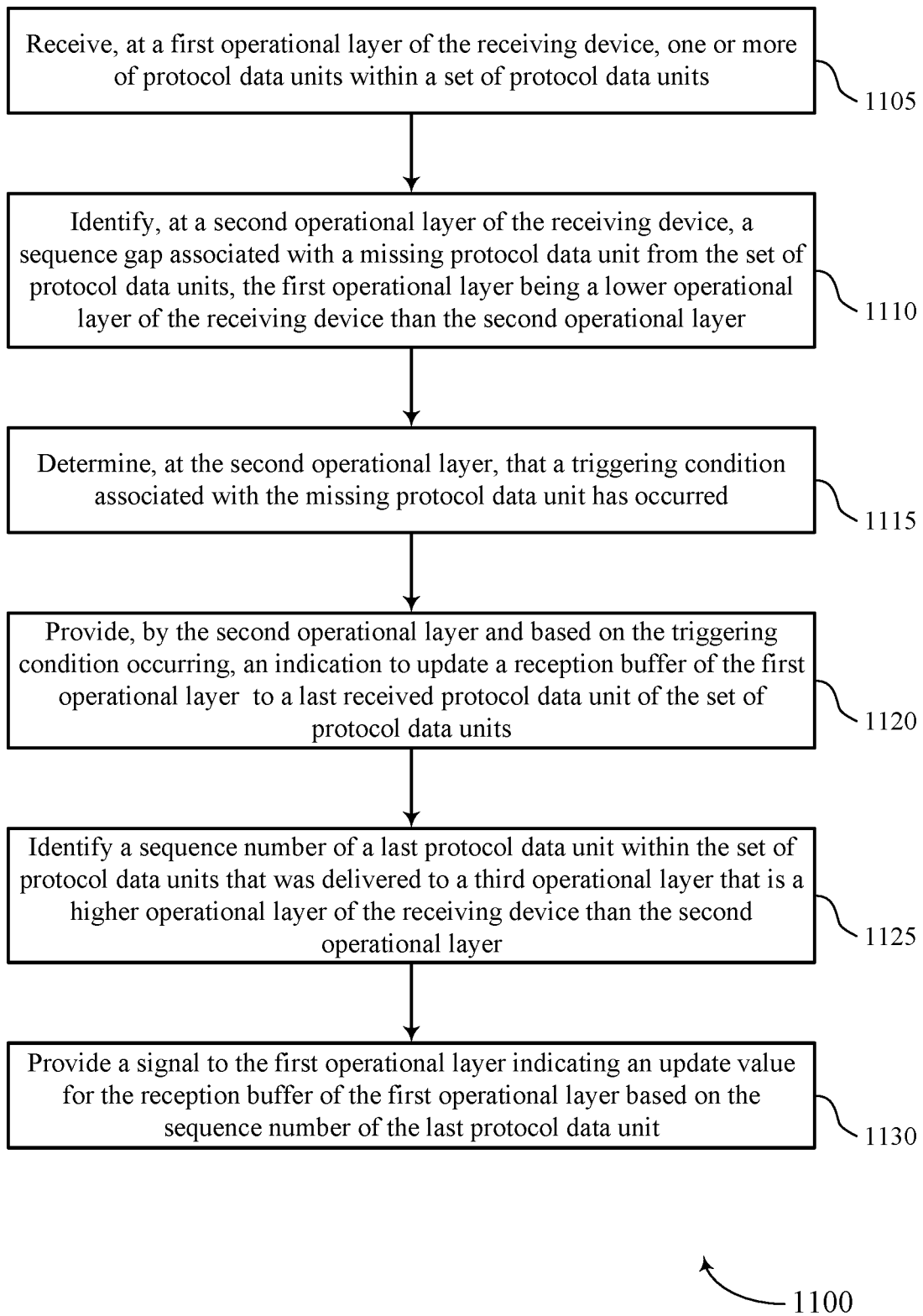

FIG. 11 shows a flowchart illustrating a method 1100 that supports methods to reduce RLC retransmission, in accordance with one or more aspects of the present disclosure. The operations of method 1100 may be implemented by a UE 115 or base station 105 or its components as described herein. For example, the operations of method 1100 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1105, the UE or base station may receive, at a first operational layer of the receiving device, one or more PDUs within a set of PDUs. The operations of 1105 may be performed according to the methods described herein. In some examples, aspects of the operations of 1105 may be performed by a PDU reception manager as described with reference to FIGS. 5 through 9.

At 1110, the UE or base station may identify, at a second operational layer of the receiving device, a sequence gap associated with a missing PDU from the set of PDUs, the first operational layer being a lower operational layer of the receiving device than the second operational layer. The operations of 1110 may be performed according to the methods described herein. In some examples, aspects of the operations of 1110 may be performed by a PDU gap manager as described with reference to FIGS. 5 through 9.

At 1115, the UE or base station may determine, at the second operational layer, that a triggering condition associated with the missing PDU has occurred. The operations of 1115 may be performed according to the methods described herein. In some examples, aspects of the operations of 1115 may be performed by a triggering condition manager as described with reference to FIGS. 5 through 9.

At 1120, the UE or base station may provide, by the second operational layer and based on the triggering condition occurring, an indication to update a reception buffer of the first operational layer to a last received PDU of the set of PDUs. The operations of 1120 may be performed according to the methods described herein. In some examples, aspects of the operations of 1120 may be performed by a reception buffer manager as described with reference to FIGS. 5 through 9.

At 1125, the UE or base station may identify a sequence number of a last PDU within the set of PDUs that was delivered to a third operational layer that is a higher operational layer of the receiving device than the second operational layer. The operations of 1125 may be performed according to the methods described herein. In some examples, aspects of the operations of 1125 may be performed by a last PDU manager as described with reference to FIGS. 5 through 9.

At 1130, the UE or base station may provide a signal to the first operational layer indicating an update value for the reception buffer of the first operational layer based on the sequence number of the last PDU. The operations of 1130 may be performed according to the methods described herein. In some examples, aspects of the operations of 1130 may be performed by a last PDU manager as described with reference to FIGS. 5 through 9.

Figure 12:
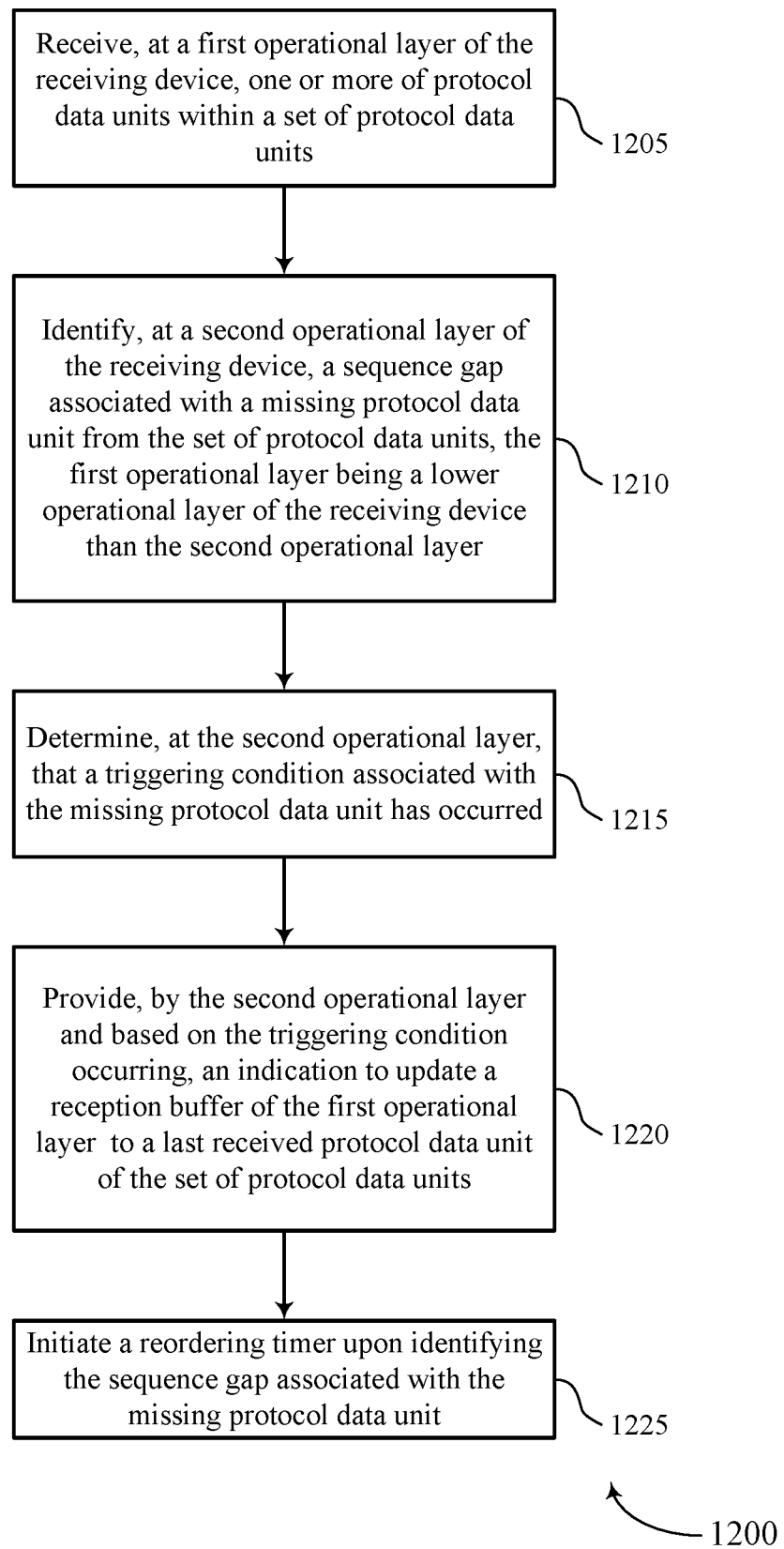

FIG. 12 shows a flowchart illustrating a method 1200 that supports methods to reduce RLC retransmission, in accordance with one or more aspects of the present disclosure. The operations of method 1200 may be implemented by a UE 115 or base station 105 or its components as described herein. For example, the operations of method 1200 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1205, the UE or base station may receive, at a first operational layer of the receiving device, one or more PDUs within a set of PDUs. The operations of 1205 may be performed according to the methods described herein. In some examples, aspects of the operations of 1205 may be performed by a PDU reception manager as described with reference to FIGS. 5 through 9.

At 1210, the UE or base station may identify, at a second operational layer of the receiving device, a sequence gap associated with a missing PDU from the set of PDUs, the first operational layer being a lower operational layer of the receiving device than the second operational layer. The operations of 1210 may be performed according to the methods described herein. In some examples, aspects of the operations of 1210 may be performed by a PDU gap manager as described with reference to FIGS. 5 through 9.

At 1215, the UE or base station may determine, at the second operational layer, that a triggering condition associated with the missing PDU has occurred. The operations of 1215 may be performed according to the methods described herein. In some examples, aspects of the operations of 1215 may be performed by a triggering condition manager as described with reference to FIGS. 5 through 9.

At 1220, the UE or base station may provide, by the second operational layer and based on the triggering condition occurring, an indication to update a reception buffer of the first operational layer to a last received PDU of the set of PDUs. The operations of 1220 may be performed according to the methods described herein. In some examples, aspects of the operations of 1220 may be performed by a reception buffer manager as described with reference to FIGS. 5 through 9.

At 1225, the UE or base station may initiate a reordering timer upon identifying the sequence gap associated with the missing PDU. The operations of 1225 may be performed according to the methods described herein. In some examples, aspects of the operations of 1225 may be performed by a reordering timer manager as described with reference to FIGS. 5 through 9.

Figure 13:
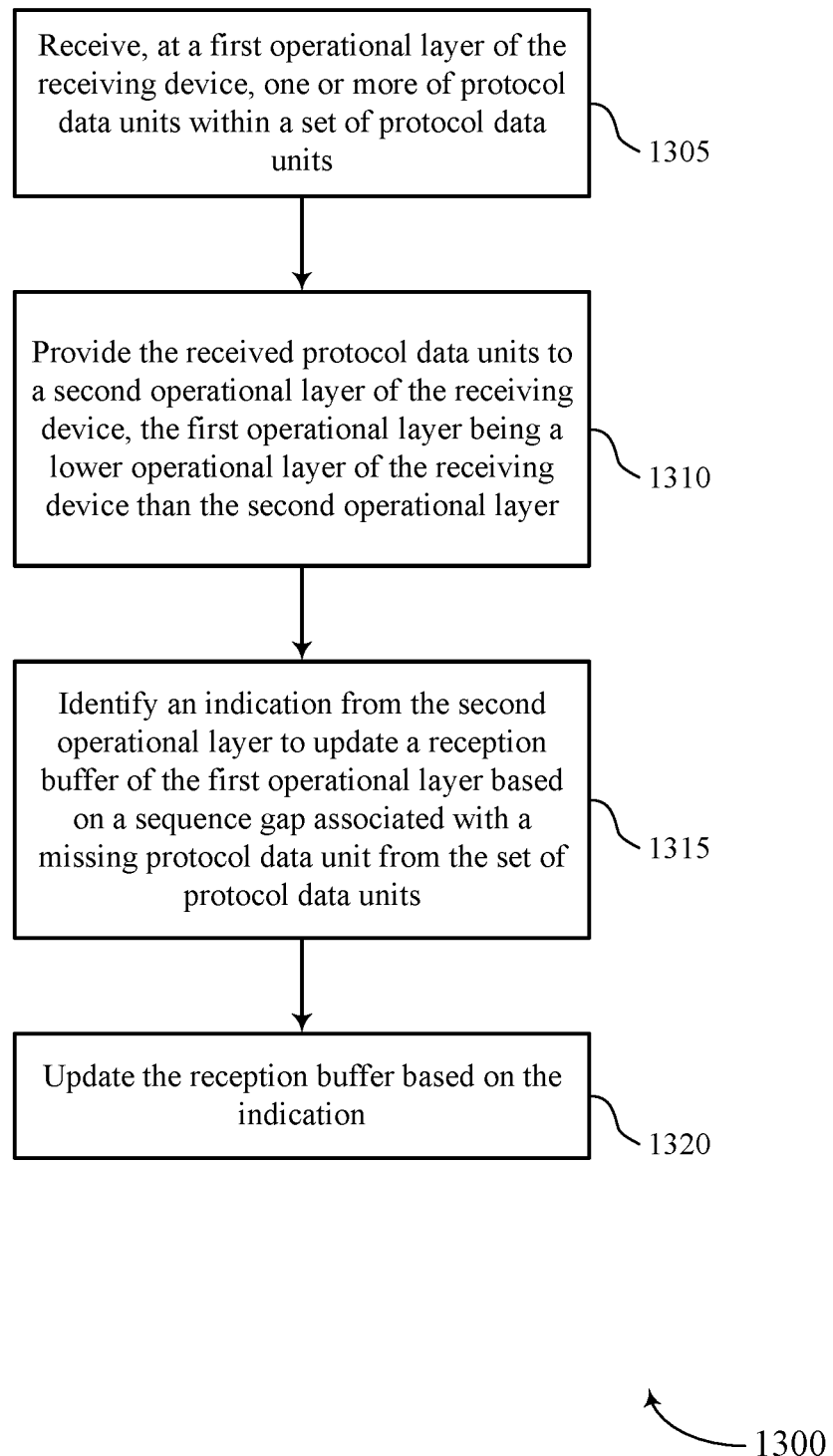

FIG. 13 shows a flowchart illustrating a method 1300 that supports methods to reduce RLC retransmission, in accordance with one or more aspects of the present disclosure. The operations of method 1300 may be implemented by a UE 115 or base station 105 or its components as described herein. For example, the operations of method 1300 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1305, the UE or base station may receive, at a first operational layer of the receiving device, one or more PDUs within a set of PDUs. The operations of 1305 may be performed according to the methods described herein. In some examples, aspects of the operations of 1305 may be performed by a PDU reception manager as described with reference to FIGS. 5 through 9.

At 1310, the UE or base station may provide the received PDUs to a second operational layer of the receiving device, the first operational layer being a lower operational layer of the receiving device than the second operational layer. The operations of 1310 may be performed according to the methods described herein. In some examples, aspects of the operations of 1310 may be performed by a PDU reception manager as described with reference to FIGS. 5 through 9.

At 1315, the UE or base station may identify an indication from the second operational layer to update a reception buffer of the first operational layer based on a sequence gap associated with a missing PDU from the set of PDUs. The operations of 1315 may be performed according to the methods described herein. In some examples, aspects of the operations of 1315 may be performed by a triggering condition manager as described with reference to FIGS. 5 through 9.

At 1320, the UE or base station may update the reception buffer based on the indication. The operations of 1320 may be performed according to the methods described herein. In some examples, aspects of the operations of 1320 may be performed by a reception buffer manager as described with reference to FIGS. 5 through 9.

Figure 14:
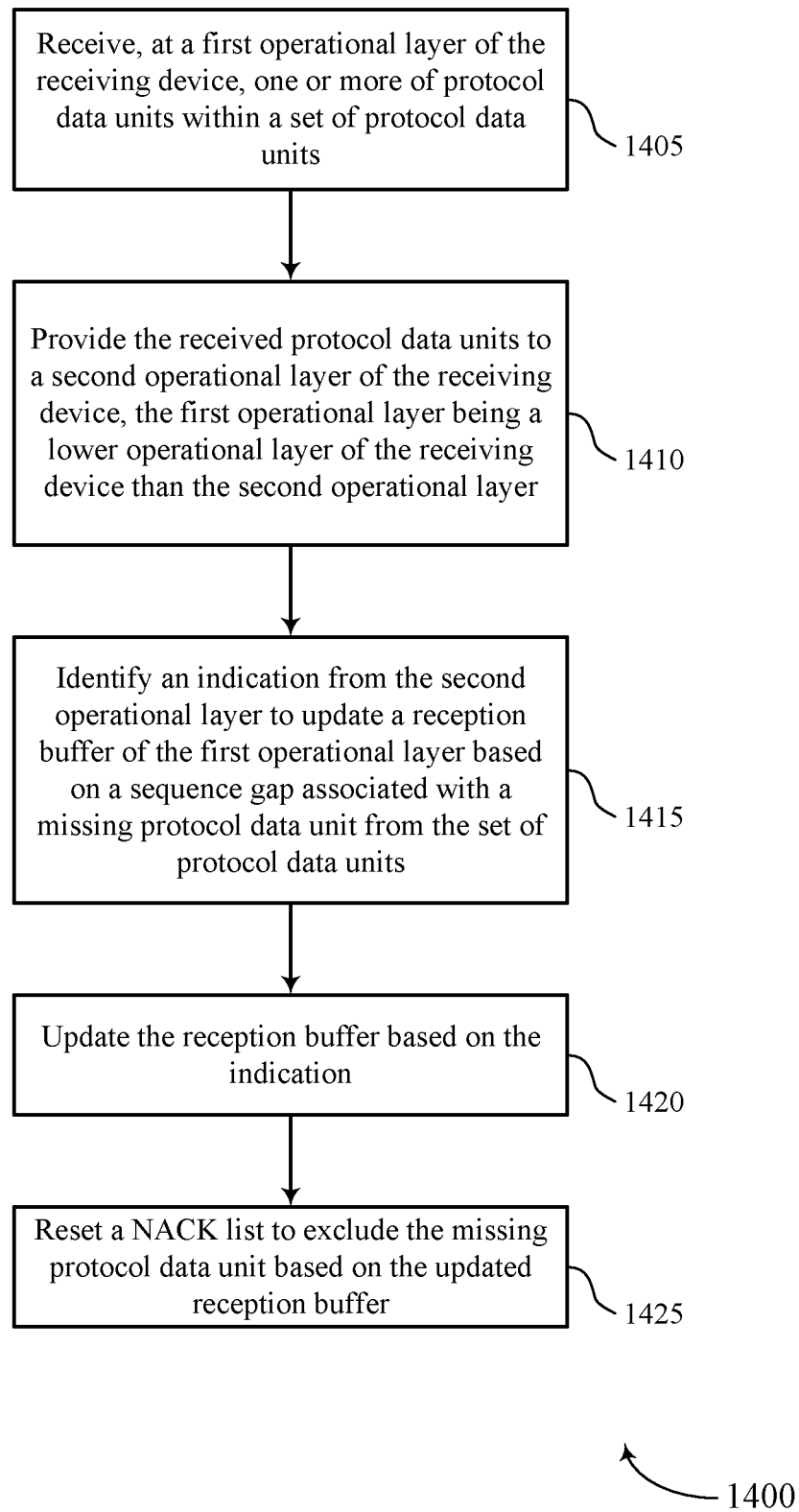

FIG. 14 shows a flowchart illustrating a method 1400 that supports methods to reduce RLC retransmission, in accordance with one or more aspects of the present disclosure. The operations of method 1400 may be implemented by a UE 115 or base station 105 or its components as described herein. For example, the operations of method 1400 may be performed by a communications manager as described with reference to FIGS. 5 through 9. In some examples, a UE or base station may execute a set of instructions to control the functional elements of the UE or base station to perform the functions described below. Additionally or alternatively, a UE or base station may perform aspects of the functions described below using special-purpose hardware.

At 1405, the UE or base station may receive, at a first operational layer of the receiving device, one or more PDUs within a set of PDUs. The operations of 1405 may be performed according to the methods described herein. In some examples, aspects of the operations of 1405 may be performed by a PDU reception manager as described with reference to FIGS. 5 through 9.

At 1410, the UE or base station may provide the received PDUs to a second operational layer of the receiving device, the first operational layer being a lower operational layer of the receiving device than the second operational layer. The operations of 1410 may be performed according to the methods described herein. In some examples, aspects of the operations of 1410 may be performed by a PDU reception manager as described with reference to FIGS. 5 through 9.

At 1415, the UE or base station may identify an indication from the second operational layer to update a reception buffer of the first operational layer based on a sequence gap associated with a missing PDU from the set of PDUs. The operations of 1415 may be performed according to the methods described herein. In some examples, aspects of the operations of 1415 may be performed by a triggering condition manager as described with reference to FIGS. 5 through 9.

At 1420, the UE or base station may update the reception buffer based on the indication. The operations of 1420 may be performed according to the methods described herein. In some examples, aspects of the operations of 1420 may be performed by a reception buffer manager as described with reference to FIGS. 5 through 9.

At 1425, the UE or base station may reset a NACK list to exclude the missing PDU based on the updated reception buffer. The operations of 1425 may be performed according to the methods described herein. In some examples, aspects of the operations of 1425 may be performed by a NACK reset manager as described with reference to FIGS. 5 through 9.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communication systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), E-UTRA, Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell may cover a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communication systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a receiving device, comprising:
  receiving, at a first operational layer of the receiving device, one or more protocol data units within a set of protocol data units;
  identifying, at a second operational layer of the receiving device, a sequence gap associated with a missing protocol data unit from the set of protocol data units, the first operational layer being a lower operational layer of the receiving device than the second operational layer;
  determining, at the second operational layer, that a triggering condition associated with the missing protocol data unit has occurred;
  providing, by the second operational layer and based at least in part on the triggering condition occurring, an indication to update a reception buffer of the first operational layer to a last received protocol data unit of the set of protocol data units;

identifying a sequence number of a last protocol data unit within the set of protocol data units that was delivered to a third operational layer that is a higher operational layer of the receiving device than the second operational layer; and providing a signal to the first operational layer indicating an update value for the reception buffer of the first operational layer based at least in part on the sequence number of the last protocol data unit.

2. The method of claim 1, further comprising:
initiating a reordering timer upon identifying the sequence gap associated with the missing protocol data unit.

3. The method of claim 1, wherein the first operational layer comprises at least one of a long term evolution (LTE) radio link control (RLC) layer, or a new radio (NR) RLC layer, or a combination thereof.

4. The method of claim 3, further comprising:
providing a first signal to the LTE RLC layer indicating a first update value for the reception buffer of the LTE RLC layer; and
providing a second signal to the NR RLC layer indicating a second update value for the reception buffer of the NR RLC layer.

5. The method of claim 1, wherein the reception buffer of the first operational layer comprises at least one of a receive next (RX_NEXT) reception buffer, or a receive state variable (VR(R)) reception buffer, or a combination thereof.

6. The method of claim 1, wherein the second operational layer comprises a packet data convergence protocol (PDCP) layer.

7. The method of claim 1, wherein the triggering condition comprises at least one of expiration of a reordering timer associated with the missing protocol data unit, or reaching a storage limit for a memory associated with the set of protocol data units, or a combination thereof.

8. A method for wireless communications at a receiving device, comprising:
receiving, at a first operational layer of the receiving device, one or more protocol data units within a set of protocol data units;
providing the received protocol data units to a second operational layer of the receiving device, the first operational layer being a lower operational layer of the receiving device than the second operational layer;
identifying an indication from the second operational layer to update a reception buffer of the first operational layer based at least in part on a sequence gap associated with a missing protocol data unit from the set of protocol data units; and
updating the reception buffer based at least in part on the indication; and
receiving a signal from the second operational layer indicating an update value for the reception buffer of the first operational layer based at least in part on a sequence number of a last protocol data unit that the second operational layer delivered to a third operational layer that is a higher operational layer of the receiving device than the second operational layer.

9. The method of claim 8, further comprising:
resetting a negative acknowledgement (NACK) list to exclude the missing protocol data unit based at least in part on the updated reception buffer.

10. The method of claim 8, wherein the first operational layer comprises at least one of a long term evolution (LTE) radio link control (RLC) layer, or a new radio (NR) RLC layer, or a combination thereof.

11. The method of claim 8, wherein the reception buffer of the first operational layer comprises at least one of a receive next (RX_NEXT) reception buffer, or a receive state variable (VR(R)) reception buffer, or a combination thereof.

12. The method of claim 8, wherein the second operational layer comprises a packet data convergence protocol (PDCP) layer.

13. An apparatus for wireless communications at a receiving device, comprising:
a processor,
memory in electronic communication with the processor; and
the processor and memory configured to:
receive, at a first operational layer of the receiving device, one or more protocol data units within a set of protocol data units;
identify, at a second operational layer of the receiving device, a sequence gap associated with a missing protocol data unit from the set of protocol data units, the first operational layer being a lower operational layer of the receiving device than the second operational layer;
determine, at the second operational layer, that a triggering condition associated with the missing protocol data unit has occurred;
provide, by the second operational layer and based at least in part on the triggering condition occurring, an indication to update a reception buffer of the first operational layer to a last received protocol data unit of the set of protocol data units;
identify a sequence number of a last protocol data unit within the set of protocol data units that was delivered to a third operational layer that is a higher operational layer of the receiving device than the second operational layer; and
provide a signal to the first operational layer indicating an update value for the reception buffer of the first operational layer based at least in part on the sequence number of the last protocol data unit.

14. The apparatus of claim 13, wherein the instructions are further executable by the processor to cause the apparatus to:
initiate a reordering timer upon identifying the sequence gap associated with the missing protocol data unit.

15. The apparatus of claim 13, wherein the first operational layer comprises at least one of a long term evolution (LTE) radio link control (RLC) layer, or a new radio (NR) RLC layer, or a combination thereof.

16. The apparatus of claim 15, wherein the instructions are further executable by the processor to cause the apparatus to:
provide a first signal to the LTE RLC layer indicating a first update value for the reception buffer of the LTE RLC layer; and
provide a second signal to the NR RLC layer indicating a second update value for the reception buffer of the NR RLC layer.

17. The apparatus of claim 13, wherein the reception buffer of the first operational layer comprises at least one of a receive next (RX_NEXT) reception buffer, or a receive state variable (VR(R)) reception buffer, or a combination thereof.

18. The apparatus of claim 13, wherein the second operational layer comprises a packet data convergence protocol (PDCP) layer.

19. The apparatus of claim 13, wherein the triggering condition comprises at least one of expiration of a reordering timer associated with the missing protocol data unit, or reaching a storage limit for a memory associated with the set of protocol data units, or a combination thereof.

20. An apparatus for wireless communications at a receiving device, comprising:
a processor,
memory in electronic communication with the processor; and
the processor and memory configured to:
receive, at a first operational layer of the receiving device, one or more protocol data units within a set of protocol data units;
provide the received protocol data units to a second operational layer of the receiving device, the first operational layer being a lower operational layer of the receiving device than the second operational layer;
identify an indication from the second operational layer to update a reception buffer of the first operational layer based at least in part on a sequence gap associated with a missing protocol data unit from the set of protocol data units; and
update the reception buffer based at least in part on the indication; and
receive a signal from the second operational layer indicating an update value for the reception buffer of the first operational layer based at least in part on a sequence number of a last protocol data unit that the second operational layer delivered to a third operational layer that is a higher operational layer of the receiving device than the second operational layer.

21. The apparatus of claim 20, wherein the instructions are further executable by the processor to cause the apparatus to:
reset a negative acknowledgement (NACK) list to exclude the missing protocol data unit based at least in part on the updated reception buffer.

22. The apparatus of claim 20, wherein the first operational layer comprises at least one of a long term evolution (LTE) radio link control (RLC) layer, or a new radio (NR) RLC layer, or a combination thereof.

23. The apparatus of claim 20, wherein the reception buffer of the first operational layer comprises at least one of a receive next (RX_NEXT) reception buffer, or a receive state variable (VR(R)) reception buffer, or a combination thereof.

24. The apparatus of claim 20, wherein the second operational layer comprises a packet data convergence protocol (PDCP) layer.

25. An apparatus for wireless communications at a receiving device, comprising:
means for receiving, at a first operational layer of the receiving device, one or more protocol data units within a set of protocol data units;
means for identifying, at a second operational layer of the receiving device, a sequence gap associated with a missing protocol data unit from the set of protocol data units, the first operational layer being a lower operational layer of the receiving device than the second operational layer;
means for determining, at the second operational layer, that a triggering condition associated with the missing protocol data unit has occurred;
means for providing, by the second operational layer and based at least in part on the triggering condition occurring, an indication to update a reception buffer of the first operational layer to a last received protocol data unit of the set of protocol data units;
means for identifying a sequence number of a last protocol data unit within the set of protocol data units that was delivered to a third operational layer that is a higher operational layer of the receiving device than the second operational layer; and
means for providing a signal to the first operational layer indicating an update value for the reception buffer of the first operational layer based at least in part on the sequence number of the last protocol data unit.

26. An apparatus for wireless communications at a receiving device, comprising:
means for receiving, at a first operational layer of the receiving device, one or more protocol data units within a set of protocol data units;
means for providing the received protocol data units to a second operational layer of the receiving device, the first operational layer being a lower operational layer of the receiving device than the second operational layer;
means for identifying an indication from the second operational layer to update a reception buffer of the first operational layer based at least in part on a sequence gap associated with a missing protocol data unit from the set of protocol data units; and
means for updating the reception buffer based at least in part on the indication; and
means for receiving a signal from the second operational layer indicating an update value for the reception buffer of the first operational layer based at least in part on a sequence number of a last protocol data unit that the second operational layer delivered to a third operational layer that is a higher operational layer of the receiving device than the second operational layer.

* * * * *